(12) United States Patent
Ishizuka

(10) Patent No.: US 7,166,655 B2
(45) Date of Patent: Jan. 23, 2007

(54) COLORED PARTICULATE DISPERSION, INK FOR INK-JET RECORDING USING THE SAME, AND INK-JET RECORDING METHOD

(75) Inventor: Takahiro Ishizuka, Kanagawa (JP)

(73) Assignee: Fuji Photo Film Co., Ltd., Minani-Ashigara (JP)

( * ) Notice: Subject to any disclaimer, the term of this patent is extended or adjusted under 35 U.S.C. 154(b) by 0 days.

(21) Appl. No.: 09/887,103

(22) Filed: Jun. 25, 2001

(65) Prior Publication Data

US 2002/0032252 A1    Mar. 14, 2002

(30) Foreign Application Priority Data

Jul. 6, 2000 (JP) .............................. 2000-204774
Jun. 11, 2001 (JP) .............................. 2001-176019

(51) Int. Cl.
  *C09D 11/10*  (2006.01)
  *C08L 53/00*  (2006.01)

(52) U.S. Cl. ...................................... 523/160; 524/505

(58) Field of Classification Search ................ 523/160, 523/161; 106/31.27; 524/505, 556, 560, 524/504

See application file for complete search history.

(56) References Cited

U.S. PATENT DOCUMENTS

| | | | |
|---|---|---|---|
| 5,085,698 A | | 2/1992 | Ma et al. |
| 5,302,654 A | * | 4/1994 | Ishii et al. ................... 524/458 |
| 5,344,933 A | * | 9/1994 | Mikoshiba et al. ......... 544/282 |
| 5,508,421 A | * | 4/1996 | Suzuki et al. ............ 548/262.4 |
| 5,545,504 A | * | 8/1996 | Keoshkerian et al. .. 430/137.17 |
| 5,631,309 A | * | 5/1997 | Yanagi et al. ................ 523/160 |
| 5,753,017 A | * | 5/1998 | Onodera et al. ......... 106/31.49 |
| 5,948,155 A | * | 9/1999 | Yui et al. .................. 106/31.58 |
| 6,204,307 B1 | * | 3/2001 | Miyabayashi et al. ...... 523/160 |
| 6,384,108 B1 | * | 5/2002 | Breton et al. ................ 523/161 |
| 6,406,526 B1 | * | 6/2002 | Meyrick et al. ......... 106/31.48 |

FOREIGN PATENT DOCUMENTS

| | | |
|---|---|---|
| JP | 56-157468 | 12/1981 |
| JP | 58-045272 | 3/1983 |
| JP | 03231975 | * 10/1991 |
| JP | 04-018468 | 1/1992 |
| JP | 09/059552 | 3/1997 |
| JP | 11-269418 | 10/1999 |
| JP | 11-286637 | 10/1999 |

OTHER PUBLICATIONS

English Translation of JP 03231975 (1991).*
Lewis, Sr, Richard J.; Hawley's Condensed Chemical Dictionary13th Ed., John Wiley & Sons, New York 1997 (p. 468).*

* cited by examiner

*Primary Examiner*—Callie Shosho
(74) *Attorney, Agent, or Firm*—Buchanan Ingersoll & Rooney PC

(57) ABSTRACT

A colored particulate dispersion is provided, in which the particle diameter of colored particulates is small and dispersion stability is excellent. Also provided is an ink for ink-jet recording in which there is little dependency on paper such that excellent color formation and color tone are obtained when printing on a freely selected paper, and which has excellent water resistance and light resistance. The colored particulate dispersion contains colored particulates that contain an oil-soluble dye and a block copolymer, which is formed of a hydrophobic segment and a hydrophilic segment. The ink for ink-jet recording contains the colored particulate dispersion.

13 Claims, No Drawings

COLORED PARTICULATE DISPERSION, INK FOR INK-JET RECORDING USING THE SAME, AND INK-JET RECORDING METHOD

BACKGROUND OF THE INVENTION

1. Field of the Invention

The present invention relates to a water-based particulate dispersion containing an oil-soluble dye, an ink for ink-jet recording containing the colored particulate dispersion, and an ink-jet recording method using the ink for ink-jet recording.

2. Description of the Related Art

In recent years, accompanying the more widespread use of computers, ink-jet printers have come to be widely used for printing on paper, film, cloth and the like, not only in offices but in homes as well. Oil-based inks, water-based inks, and solid inks are known as inks for ink-jet recording. Among these inks, water-based inks are advantageous from the standpoints of ease of manufacture, handling, odor, safety, and the like, and thus, water-based inks are mainly used.

However, most water-based inks use a water-soluble dye which dissolves in a molecular state. Thus, water-based inks have advantages that transparency and color density thereof are high. However, because these dyes are water-soluble, their water resistance is poor. When printing is carried out on so-called regular paper, problems arise in that bleeding occurs such that printing quality markedly deteriorates, and that light resistance is poor.

In order to overcome the above-described problems, Japanese Patent Application Laid-Open (JP-A) Nos. 56-157468, 4-18468, 10-110126, 10-195355 and the like, for example, have proposed water-based inks that utilize a pigment and a dispersed dye.

However, with these water-based inks, although the water resistance is improved to a certain extent, it is still insufficient. There are further problems, in that storage stability of a dispersion of the pigment and the dispersed dye in the water-based ink is lacking, it is easy for the ink to become clogged in ink discharge ports, and the like. Moreover, in the case of such water-based inks, generally, the hue is insufficient, and there are problems with color reproducibility due to insufficient color tone.

On the other hand, JP-A Nos. 58-45272, 6-340835, 7-268254, 7-268257, and 7-268260 propose methods of encapsulating dyes in urethane or polyester dispersion particles. Moreover, JP-A No. 11-269418 and U.S. Pat. No. 5,085,698 propose a method of using, as a dispersing agent, a block copolymer which is formed by a hydrophobic segment and a hydrophilic segment. However, with ink-jet inks obtained by these methods, there are problems in that the color tone is insufficient and the color reproducibility is also insufficient.

Further, JP-A Nos. 9-59552, 9-111163, 9-255887, 10-36728, 11-286637 and the like disclose that the color tone can be improved by using a dye in which an aromatic diamine is coupled to a color photographic coupler. However, in these inventions, there are problems in that there is a tendency for particle diameters or a particle diameter distribution of the dispersion to be large, dispersion stability and suitability for printing are insufficient, and the color tone varies in accordance with the type of image-receiving paper.

SUMMARY OF THE INVENTION

The present invention overcomes the above-described drawbacks of the conventional art, and achieves the following objects. Namely, an object of the present invention is to provide a colored particulate dispersion in which the particle diameter of the colored particulates is small, the dispersion stability is excellent, there is little dependency on paper such that excellent color formation and color tone are obtained when printing on freely selected paper, and which has excellent water resistance and light resistance, and which is suitable for a water-based ink for writing, a water-based printing ink, an ink for information recording, or the like. Another object of the present invention is to provide an ink for ink-jet recording and an ink-jet recording method which are suitable for thermal, piezoelectric, electric field and acoustic ink-jet systems, with which, when printing or the like is carried out using nozzles or the like, there is little clogging of the nozzle tips, in which there is little dependency on paper and excellent color formation and color tone are obtained when printing on a freely selected paper, and in which water resistance and light resistance are excellent.

Means for achieving the above objects are as follows.

In accordance with a first aspect, the present invention is a colored particulate dispersion containing colored particulates that include an oil-soluble dye and a block copolymer formed with a hydrophobic segment and a hydrophilic segment.

In accordance with a second aspect, the present invention is the colored particulate dispersion, in which the oil-soluble dye is a compound expressed by following general formula (1):

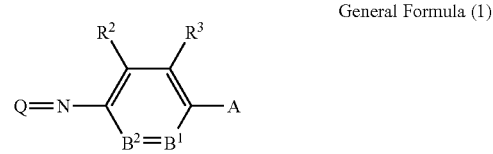

General Formula (1)

in which: Q represents an atomic group which is necessary for the compound expressed by general formula (I) to have absorption in a visible range or near-infrared range; A represents $-NR^4R^5$ or a hydroxy group, and $R^4$ and $R^5$ each independently represents a hydrogen atom, an alkyl group, an aryl group, or a heterocyclic group; $B^1$ represents $=C(R^6)-$ or $=N-$; $B^1$ represents $-C(R^7)=$ or $-N=$; $R^2$, $R^3$, $R^6$ and $R^7$ each independently represents a hydrogen atom or a substituent; and $R^2$ and $R^3$, $R^3$ and $R^4$, $R^4$ and $R^5$, $R^5$ and $R^6$, and $R^6$ and $R^7$ may bond together to form rings.

In accordance with a third aspect, the present invention is the colored particulate dispersion, in which the block copolymer is a vinyl polymer.

In accordance with a fourth aspect, the present invention is the colored particulate dispersion, in which the block copolymer has an ionic group, and a contained amount of the ionic group is at least 0.2 mmol/g and at most 5.0 mmol/g.

In accordance with a fifth aspect, the present invention is the colored particulate dispersion, in which the colored particulates are prepared by emulsification by one of adding water to an organic solvent phase that contains the block copolymer and the oil-soluble dye and adding the organic solvent phase to water.

In accordance with a sixth aspect, the present invention is the colored particulate dispersion, in which the colored particulates contain a hydrophobic high-boiling point organic solvent.

In accordance with a seventh aspect, the present invention is an ink for ink-jet recording that includes the colored particulate dispersion.

In accordance with an eighth aspect, the present invention is an ink-jet recording method in which recording is carried out using the ink for ink-jet recording.

DESCRIPTION OF THE PREFERRED EMBODIMENTS

A colored particulate dispersion, an ink for ink-jet recording, and an ink-jet recording method of the present invention will be described hereinafter.

(Colored Particulate Dispersion)

In the colored particulate dispersion of the present invention, colored particulates, which contain an oil-soluble dye and a block copolymer, are dispersed in a water-based medium.

-Oil-Soluble Dye-

Among oil-soluble dyes which can be used in the present invention, a freely selected dye can be used for a yellow dye. Examples of the yellow dye include aryl or heterylazo dyes having, as a coupling component thereof, a phenol, a naphthol, an aniline, a pyrazolone, a pyridone, or a closed chain type active methylene compound; azomethine dyes having, as the coupling component thereof, a closed type active methylene compound; methine dyes such as benzylidene dyes, monomethineoxonol dyes, and the like; quinone dyes such as naphthoquinone dyes, anthraquinone dyes, and the like; and the like. Other types of dyes which can be used are quinophthalone dyes, nitro/nitroso dyes, acridine dyes, acridinone dyes, and the like.

Among the oil-soluble dyes which can be used in the present invention, a freely selected dye can be used for a magenta dye. Examples of the magenta dye include aryl or heterylazo dyes having, as the coupling component thereof, a phenol, a naphthol, or an aniline; azomethine dyes having, as the coupling component thereof, a pyrazolone or a pyrazotriazole; methine dyes such as arylidene dyes, styryl dyes, merocyanine dyes, and oxonol dyes; carbonium dyes such as diphenylmethane dyes, triphenylmethane dyes, xanthene dyes; quinone dyes such as naphthoquinone, anthraquinone, anthrapyridone and the like; condensed polycyclic dyes such as dioxazine dyes and the like; and the like.

Among the oil-soluble dyes which can be used in the present invention, a freely selected dye can be used for a cyan dye. Examples of the cyan dye include indoaniline dyes, indophenol dyes, and azomethine dyes having a pyrrolotriazole as the coupling component thereof; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heterylazo dyes having, as the coupling component thereof, a phenol, a naphthol, or an aniline; indigo/thioindigo dyes; and the like.

Each of the aforementioned dyes may first provide a color, yellow, magenta or cyan, when a chromophore portion thereof dissociates. A counter cation in this case may be an alkali metal, an inorganic cation such as ammonium, or an organic cation such as a pyridinium or a quaternary ammonium salt, or may be a polymer cation having a cation in a partial structure.

Among these dyes, dyes which are generated from couplers and developing chemicals in photographic materials are effective. Dyes represented by following general formula (I) are preferable as such dyes.

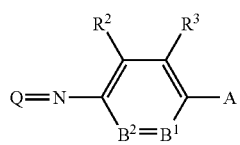

General Formula (I)

In general formula (I), A represents —NR$^4$R$^5$ or a hydroxy group, and R$^4$ and R$^5$ each independently represents a hydrogen atom, an alkyl group, an aryl group, or a heterocyclic group. More specifically, R$^4$ and R$^5$ each independently represents a hydrogen atom, an alkyl group [a substituted or unsubstituted alkyl group which is linear, branched, or cyclic; this encompasses alkyl groups (preferably alkyl groups having from 1 to 30 carbon atoms, e.g., methyl, ethyl, n-propyl, isopropyl, t-butyl, n-octyl, eicosyl, 2-chloroethyl, 2-cyanoethyl, or 2-ethylhexyl), cycloalkyl groups (preferably substituted or unsubstituted cycloalkyl groups having from 3 to 30 carbon atoms, e.g., cyclohexyl, cyclopentyl, or 4-n-dodecylcyclohexyl), bicycloalkyl groups (preferably substituted or unsubstituted bicycloalkyl groups having from 5 to 30 carbon atoms, i.e., a monovalent group formed by removing one hydrogen atom from a bicycloalkane having from 5 to 30 carbon atoms, e.g., bicyclo[1,2,2]heptane-2-yl or bicyclo[2,2,2]octane-3-yl), and tricyclo structures having many ring structures; alkyl groups among the substituents which will be described hereinafter (e.g., alkyl groups of alkylthio groups) also refer to alkyl groups such as those described above], an aryl group (preferably a substituted or unsubstituted aryl group having from 6 to 30 carbon atoms, e.g., phenyl, p-tolyl, naphthyl, m-chlorophenyl, or o-hexadecanoylaminophenyl), or a heterocyclic group (preferably a monovalent group which is obtained by removing one hydrogen atom from a five- or six-membered substituted or unsubstituted aromatic or non-aromatic heterocyclic group, and more preferably a five- or six-membered aromatic heterocyclic group having from 3 to 30 carbon atoms, e.g., 2-furyl, 2-thienyl, 2-pyrimidinyl, or 2-benzothiazolyl).

If R$^4$ or R$^5$ is an alkyl group, an aryl group, or a heterocyclic group, the group represented by R$^4$ or R$^5$ may be substituted. Examples of preferable substituents are halogen atoms, alkyl groups (including cycloalkyl groups and bicycloalkyl groups), alkenyl groups (including cycloalkenyl groups and bicycloalkenyl groups), alkinyl groups, aryl groups, heterocyclic groups, cyano groups, hydroxyl groups, nitro groups, carboxyl groups, alkoxy groups, aryloxy groups, silyloxy groups, heterocyclic oxy groups, acyloxy groups, carbamoyloxy groups, alkoxycarbonyloxy groups, aryloxycarbonyloxy groups, amino groups (including anilino groups), acylamino groups, aminocarbonylamino groups, alkoxycarbonylamino groups, aryloxycarbonylamino groups, sulfamoylamino groups, alkyl and arylsulfonylamino groups, mercapto groups, alkylthio groups, arylthio groups, heterocyclic thio groups, sulfamoyl groups, sulfo groups, alkyl and arylsulfinyl groups, alkyl and arylsulfonyl groups, acyl groups, aryloxycarbonyl groups, alkoxycarbonyl groups, carbamoyl groups, aryl and heterocyclic azo groups, imido groups, phosphino groups, phosphinyl groups, phosphinyloxy groups, phosphinylamino groups, and silyl groups.

More specifically, examples are halogen atoms (e.g., a chlorine atom, bromine atom, or iodine atom), alkyl groups [a substituted or unsubstituted alkyl group which is linear, branched, or cyclic; this encompasses alkyl groups (preferably alkyl groups having from 1 to 30 carbon atoms, e.g., methyl, ethyl, n-propyl, isopropyl, t-butyl, n-octyl, eicosyl, 2-chloroethyl, 2-cyanoethyl, or 2-ethylhexyl), cycloalkyl groups (preferably substituted or unsubstituted cycloalkyl groups having from 3 to 30 carbon atoms, e.g., cyclohexyl, cyclopentyl, or 4-n-dodecylcyclohexyl), bicycloalkyl groups (preferably substituted or unsubstituted bicycloalkyl groups having from 5 to 30 carbon atoms, i.e., a monovalent group formed by removing one hydrogen atom from a bicycloalkane having from 5 to 30 carbon atoms, e.g., bicyclo[1,2,2]heptane-2-yl or bicyclo[2,2,2]octane-3-yl), and tricyclo structures having many ring structures; alkyl groups among the substituents which will be described hereinafter (e.g., alkyl groups of alkylthio groups) also refer to alkyl groups such as those described above], alkenyl groups [a substituted or unsubstituted alkenyl group which is linear, branched, or cyclic, such as alkenyl groups (preferably substituted or unsubstituted alkenyl groups having from 2 to 30 carbon atoms, e.g., vinyl, allyl, prenyl, geranyl, or oleyl), cycloalkenyl groups (preferably substituted or unsubstituted cycloalkenyl groups having from 3 to 30 carbon atoms, namely, a monovalent group obtained by removing one hydrogen atom from a cycloalkene having from 3 to 30 carbon atoms, e.g., 2-cyclopentene-1-yl, or 2-cyclohexene-1-yl), bicycloalkenyl groups (substituted or unsubstituted bicycloalkenyl groups, and preferably substituted or unsubstituted bicycloalkenyl groups having from 5 to 30 carbon atoms, namely, a monovalent group obtained by removing one hydrogen atom from a bicycloalkene which has a single double bond, e.g., bicyclo[2,2,1]hepto-2-ene-1-yl or bicyclo[2,2,2]octo-2-ene-4-yl)], alkinyl groups (preferably a substituted or unsubstituted alkinyl group having from 2 to 30 carbon atoms, e.g., an ethynyl, propargyl, or trimethylsilylethynyl group), aryl groups (preferably a substituted or unsubstituted aryl group having from 6 to 30 carbon atoms, e.g., phenyl, p-tolyl, naphthyl, m-chlorophenyl, or o-hexadecanoylaminophenyl), heterocyclic groups (preferably a monovalent group which is obtained by removing one hydrogen atom from a five- or six-membered substituted or unsubstituted aromatic or non-aromatic heterocyclic compound, and more preferably a five- or six-membered aromatic heterocyclic group having from 3 to 30 carbon atoms, e.g., 2-furyl, 2-thienyl, 2-pyrimidinyl, or 2-benzothiazolyl), cyano groups, hydroxyl groups, nitro groups, carboxyl groups, alkoxy groups (preferably substituted or unsubstituted alkoxy groups having from 1 to 30 carbon atoms, e.g., methoxy, ethoxy, isopropoxy, t-butoxy, n-octyloxy, or 2-methoxyethoxy), aryloxy groups (preferably substituted or unsubstituted aryloxy groups having from 6 to 30 carbon atoms, e.g., phenoxy, 2-methylphenoxy, 4-t-butylphenoxy, 3-nitrophenoxy, or 2-tetradecanoylaminophenoxy), silyloxy groups (preferably silyloxy groups having from 3 to 20 carbon atoms, e.g., trimethylsilyloxy, or t-butyldimethylsilyloxy), heterocyclic oxy groups (preferably substituted or unsubstituted heterocyclic oxy groups having from 2 to 30 carbon atoms, e.g., 1-phenyltetrazole-5-oxy or 2-tetrahydropyranyloxy), acyloxy groups (preferably formyloxy groups, substituted or unsubstituted alkylcarbonyloxy groups having from 2 to 30 carbon atoms, or substituted or unsubstituted arylcarbonyloxy groups having from 6 to 30 carbon atoms, e.g., formyloxy, acetyloxy, pivaloyloxy, stearoyloxy, benzoyloxy, or p-methoxyphenylcarbonyloxy), carbamoyloxy groups (preferably substituted or unsubstituted carbamoyloxy groups having from 1 to 30 carbon atoms, e.g., N,N-dimethylcarbamoyloxy, N,N-diethylcarbamoyloxy, morpholinocarbonyloxy, N,N-di-n-octylaminocarbonyloxy, or N-n-octylcarbamoyloxy), alkoxycarbonyloxy groups (preferably substituted or unsubstituted alkoxycarbonyloxy groups having from 2 to 30 carbon atoms, e.g., methoxycarbonyloxy, ethoxycarbonyloxy, t-butoxycarbonyloxy, or n-octylcarbonyloxy), aryloxycarbonyloxy groups (preferably substituted or unsubstituted aryloxycarbonyloxy groups having from 7 to 30 carbon atoms, e.g., phenoxycarbonyloxy, p-methoxyphenoxycarbonyloxy, or p-n-hexadecyloxyphenoxycarbonyloxy), amino groups (preferably amino groups, substituted or unsubstituted alkylamino groups having from 1 to 30 carbon atoms, and substituted or unsubstituted anilino groups having from 6 through 30 carbon atoms, e.g., amino, methylamino, dimethylamino, anilino, N-methyl-anilino, or diphenylamino), acylamino groups (preferably, formylamino groups, substituted or unsubstituted alkylcarbonylamino groups having from 1 to 30 carbon atoms, and substituted or unsubstituted arylcarbonylamino groups having from 6 to 30 carbon atoms, e.g., formylamino, acetylamino, pivaloylamino, lauroylamino, benzoylamino, or 3,4,5-tri-n-octyloxyphenylcarbonylamino), aminocarbonylamino groups (preferably substituted or unsubstituted aminocarbonylamino having from 1 to 30 carbon atoms, e.g., carbamoylamino, N-N-dimethylaminocarbonylamino, N,N-diethylaminocarbonylamino, or morpholinocarbonylamino), alkoxycarbonylamino groups (preferably substituted or unsubstituted alkoxycarbonylamino groups having from 2 to 30 carbon atoms, e.g., methoxycarbonylamino, ethoxycarbonylamino, t-butoxycarbonylamino, n-octadecyloxycarbonylamino, or N-methyl-methoxycarbonylamino), aryloxycarbonylamino groups (preferably substituted or unsubstituted aryloxycarbonylamino groups having from 7 to 30 carbon atoms, e.g., phenoxycarbonylamino, p-chlorophenoxycarbonylamino, or m-n-octyloxyphenoxycarbonylamino), sulfamoylamino groups (preferably substituted or unsubstituted sulfamoylamino groups having from 0 to 30 carbon atoms, e.g., sulfamoylamino, N,N-dimethylaminosulfonylamino, or N-n-octylaminosulfonylamino), alkyl and arylsulfonylamino groups (preferably substituted or unsubstituted alkylsulfonylamino groups having from 1 to 30 carbon atoms, and substituted or unsubstituted arylsulfonylamino groups having from 6 to 30 carbon atoms, e.g., methylsulfonylamino, butylsulfonylamino, phenylsulfonylamino, 2,3,5-trichlorophenylsulfonylamino, or p-methylphenylsulfonylamino), mercapto groups, alkylthio groups (preferably substituted or unsubstituted alkylthio groups having from 1 to 30 carbon atoms, e.g., methylthio, ethylthio, or n-hexadecylthio), arylthio groups (preferably substituted or unsubstituted arylthio groups having from 6 to 30 carbon atoms, e.g., phenylthio, p-chlorophenylthio, or m-methoxyphenylthio), heterocyclic thio groups (preferably substituted or unsubstituted heterocyclic thio groups having from 2 to 30 carbon atoms, e.g., 2-benzothiazolylthio or 1-phenyltetrazole-5-ylthio), sulfamoyl groups (preferably substituted or unsubstituted sulfamoyl groups having from 0 to 30 carbon atoms, e.g., N-ethylsulfamoyl, N-(3-dodecyloxypropyl)sulfamoyl, N,N-dimethylsulfamoyl, N-acetylsulfamoyl, N-benzoylsulfamoyl, or N-(N'-phenylcarbamoyl)sulfamoyl), sulfo groups, alkyl and arylsulfinyl groups (preferably substituted or unsubstituted alkylsulfinyl groups having from 1 to 30 carbon atoms, substituted or unsubstituted arylsulfinyl groups having from 6 to 30 carbon atoms, e.g., methylsulfinyl, ethylsulfinyl, phenylsulfinyl, or p-methylphenylsulfinyl), alkyl and arylsulfonyl groups (preferably substituted or unsubstituted alkylsulfonyl groups having from 1 to 30 carbon atoms and substituted or unsubstituted arylsulfonyl groups having from 6 to 30 carbon atoms, e.g., methylsulfonyl, ethylsulfonyl, phenylsulfonyl, or p-methylphenylsulfonyl), acyl groups (preferably formyl groups, substituted or unsubstituted alkylcarbonyl groups having from 2 to 30 carbon atoms, and substituted or unsubstituted arylcarbonyl groups having from 7 to 30 carbon atoms, e.g., acetyl, pivaloyl, 2-chloroacetyl, stearoyl, benzoyl, or p-n-octyloxyphenylcarbonyl), aryloxycarbonyl groups (preferably substituted or unsubstituted aryloxycarbonyl groups having from 7 to 30 carbon atoms, e.g., phenoxycarbonyl, o-chlorophenoxycarbonyl, m-nitrophenoxycarbonyl, or p-t-butylphenoxycarbonyl), alkoxycarbonyl groups (preferably substituted or unsubstituted alkoxycarbonyl groups having from 2 to 30 carbon atoms, e.g., methoxycarbonyl, ethoxycarbonyl, t-butoxycarbonyl, or n-octadecyloxycarbonyl), carbamoyl groups (preferably substituted or unsubstituted carbamoyl having from 1 to 30 carbon atoms, e.g., carbamoyl, N-methylcarbamoyl, N,N-dimethylcarbamoyl, N,N-di-n-octylcarbamoyl, or N-(methylsulfonyl)carbamoyl), aryl and heterocyclic azo groups (preferably substituted or unsubstituted arylazo groups having from 6 to 30 carbon atoms, substituted or unsubstituted heterocyclic azo groups having from 3 to 30 carbon atoms, e.g., phenylazo, p-chlorophenylazo, or 5-ethylthio-1,3,4-thiadiazole-2-ylazo), imido groups (preferably N-succinimide or N-phthalimide), phosphino groups (preferably substituted or unsubstituted phosphino groups having from 2 to 30 carbon atoms, e.g., dimethylphosphino, diphenylphosphino, or methylphenoxyphosphino), phosphinyl groups (preferably substituted or unsubstituted phosphinyl groups having from 2 to 30 carbon atoms, e.g., phosphinyl, dioctyloxyphosphinyl, or diethoxyphosphinyl), phosphinyloxy groups (preferably substituted or unsubstituted phosphinyloxy groups having from 2 to 30 carbon atoms, e.g., diphenoxyphosphinyloxy or dioctyloxyphosphinyloxy), phosphinylamino groups (preferably substituted or unsubstituted phosphinylamino groups having from 2 to 30 carbon atoms, e.g., dimethoxyphosphinylamino, dimethylaminophosphinylamino), silyl groups (preferably substituted or unsubstituted silyl groups having from 3 to 30 carbon atoms, e.g., trimethylsilyl, t-butyldimethylsilyl, or phenyldimethylsilyl).

A is preferably —$NR^4R^5$. Preferably, $R^4$ and $R^5$ are each independently a hydrogen atom, an alkyl group, a substituted alkyl group, an aryl group or a substituted aryl group, more preferably a hydrogen atom, an alkyl group or a substituted alkyl group, and most preferably an alkyl group having from 1 to 18 carbon atoms or a substituted alkyl group having from 1 to 18 carbon atoms.

In the above general formula (I), $B^1$ represents =C($R^6$)— or =N—, and $B^2$ represents —C($R^7$)= or —N=. It is preferable that $B^1$ and $B^2$ are not simultaneously —N=, and a case in which $B^1$ is =C($R^6$)— and $B^2$ is —C($R^7$)= is more preferable.

In general formula (I), $R^2$, $R^3$, $R^6$ and $R^7$ each independently represents a hydrogen atom or a substituent. The substituent is preferably a substituent having from 1 to 30 carbon atoms. Specific examples are the same as those given as examples of substituents of the groups represented by $R^4$ and $R^5$.

$R^2$ preferably represents a hydrogen atom, an alkyl group having from 1 to 20 carbon atoms, an alkoxy group, an acylamino group, or a ureido group, and more preferably represents a hydrogen atom or an alkyl group having from 1 to 3 carbon atoms.

$R^3$, $R^6$ and $R^7$ are preferably a hydrogen atom, an alkyl group having from 1 to 20 carbon atoms, an alkoxy group, an acylamino group, or a ureido group, more preferably a hydrogen atom or an alkyl group having from 1 to 3 carbon atoms, and most preferably a hydrogen atom.

$R^2$ and $R^3$, $R^3$ and $R^4$, $R^4$ and $R^5$, $R^5$ and $R^6$, and $R^6$ and $R^7$ may bond together to form rings.

In the above general formula (I), Q represents an atomic group which is necessary for the compound expressed by general formula (I) to have absorption in the visible range and/or the near-infrared range. More specific explanation is given in Japanese Patent Application No. 2000-80259. Preferable examples of the atomic group are (Cp-1) through (Cp-28) in Japanese Patent Application No. 2000-80259, which are given hereinafter.

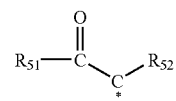
(Cp-1)

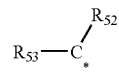
(Cp-2)

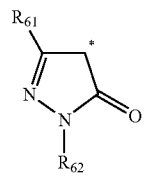
(Cp-3)

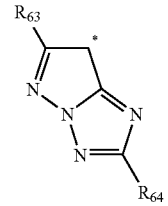
(Cp-4)

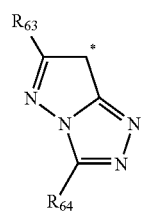
(Cp-5)

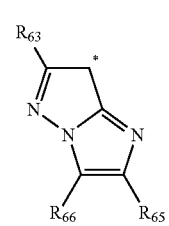
(Cp-6)

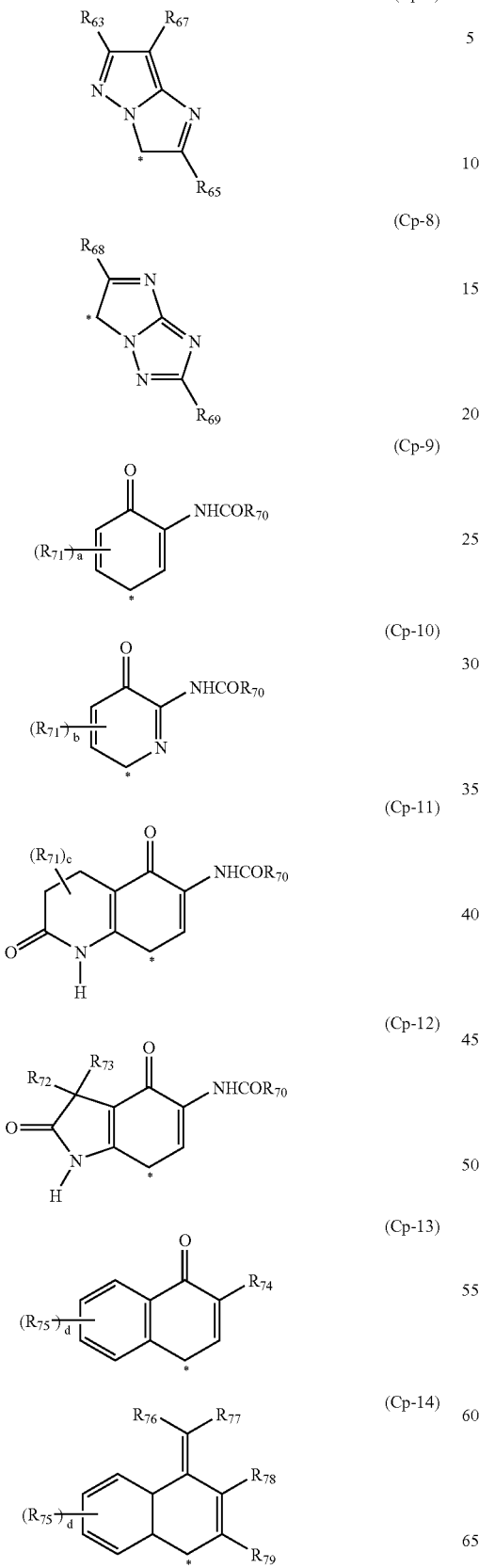
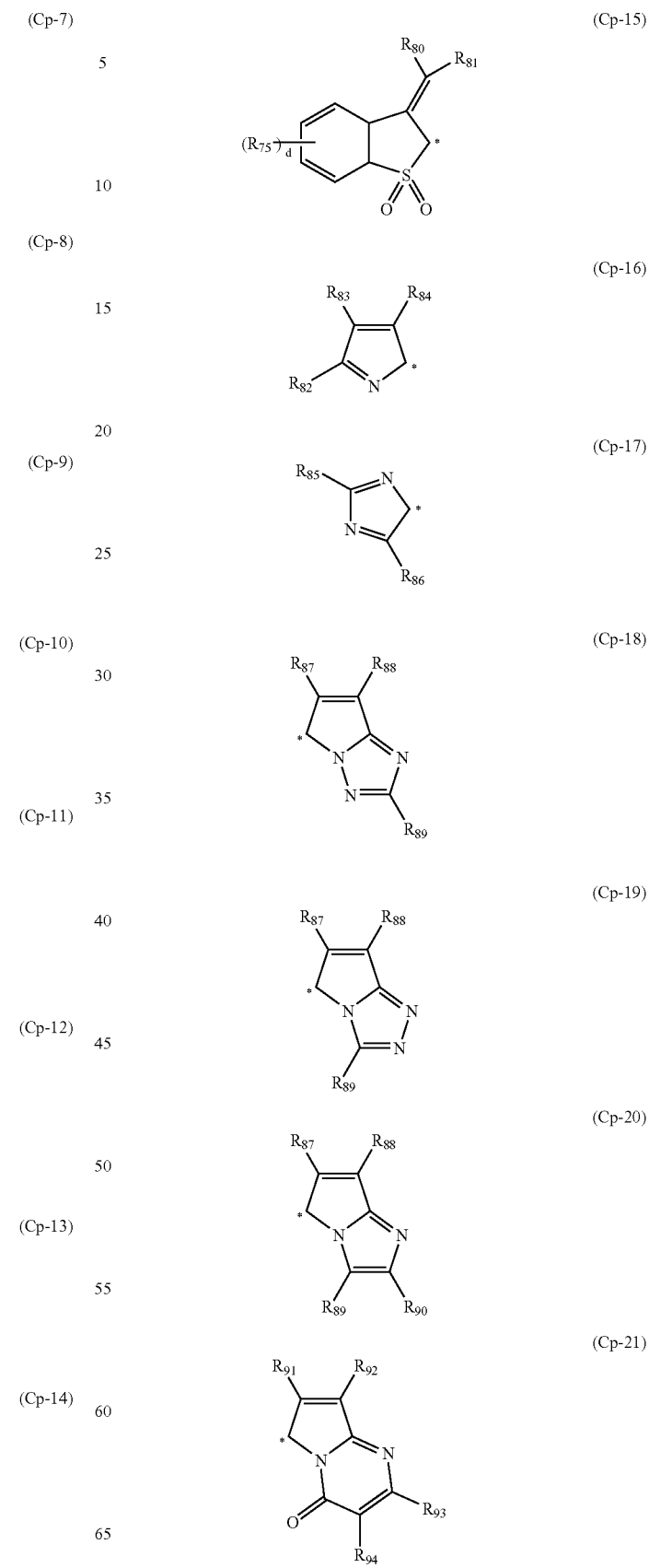

-continued (Cp-22)
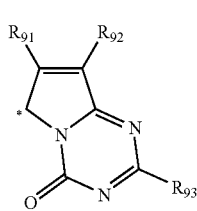

(Cp-23)
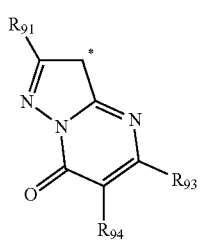

(Cp-24)
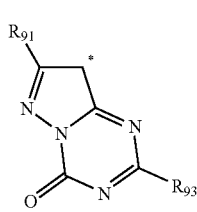

(Cp-25)
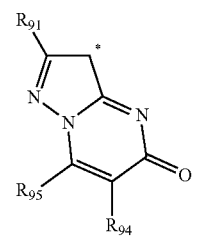

(Cp-26)
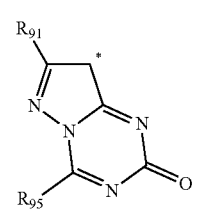

(Cp-27)
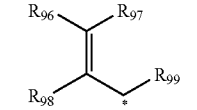

(Cp-28)
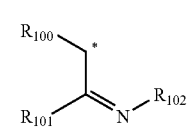

At the position marked with * therein, the group of (Cp-1) through (Cp-28) bonds to the other group as Q in the general formula (I).

(Cp-1) through (Cp-28) are described in detail hereinunder.

In the formula (Cp-1), $R_{51}$ represents an alkyl group, an aryl group, a heterocyclic group, or an alkoxy group; $R_{52}$ represents a carbamoyl group or a cyano group. Preferably, $R_{51}$ is a t-butyl group, a 1-ethylcyclopropyl group, a 1-methylcyclopropyl group, a 1-benzylcyclopropyl group, a substituted or unsubstituted phenyl group, a substituted or unsubstituted 1-indolinyl group, or a substituted or unsubstituted indol-3-yl group; and $R_{52}$ is an N-arylcarbamoyl group or a cyano group.

In the formula (Cp-2), $R_{53}$ represents an aryl group or a heterocyclic group; and $R_{52}$ has the same meaning as $R_{52}$ in (Cp-1). Preferably, $R_{53}$ is a substituted or unsubstituted phenyl group, or a substituted or unsubstituted heterocyclic group (more preferably, a thiazol-2-yl, benzothiazol-2-yl, oxazol-2-yl, benzoxazol-2-yl, 1,2,4-oxadiazol-3 (or 5)-yl, 1,3,4-oxadiazol-2 (or 5)-yl, 1,2,4-thiadiazol-3 (or 5)-yl, 1,3, 4-thiadiazol-2 (or 5)-yl, pyrazol-3-yl, indazol-3-yl, 1,2,4-triazol-3-yl, 2-pyridyl, 2-pyrimidinyl, 2-pyrazinyl, quinazolin-2-yl, or quinazolin-4-yl group); and $R_{52}$ is a cyano group.

In the formula (Cp-3), $R_{61}$ represents an alkyl group, an aryl group, a heterocyclic group, an acylamino group, an amino group, an alkoxy group, an aryloxy group, an alkylthio group, an arylthio group, an aminocarbonylamino group, or an alkoxycarbonylamino group. $R_{62}$ represents an alkyl group, an aryl group, or a heterocyclic group. Preferably, $R_{61}$ is an alkyl group, an acylamino group, an amino group, an aminocarbonylamino group, or an alkoxycarbonylamino group; and $R_{62}$ is an aryl group or a heterocyclic group. More preferably, $R_{61}$ is an acylamino group or an N-arylamino group; and $R_{62}$ is an aryl group.

In the formulae (Cp-4) and (Cp-5), $R_{63}$ and $R_{64}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, or an alkoxycarbonylamino group. Preferably, $R_{63}$ is an alkyl group, an aryl group, an alkoxy group, or an aryloxy group; and $R_{64}$ is an alkyl group or an aryl group. More preferably, $R_{63}$ is a methyl group, a t-butyl group, or a substituted or unsubstituted phenyl group.

In the formulae (Cp-6) and (Cp-7), $R_{63}$ has the same meaning as above; and $R_{65}$, $R_{66}$ and $R_{67}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group. Preferably, $R_{63}$ is an alkyl group, an aryl group, an alkoxy group, or an aryloxy group; and $R_{65}$, $R_{66}$ and $R_{67}$ each are a hydrogen atom, an alkyl group, an aryl group, an acyl group, an alkoxycarbonyl group, or a carbamoyl group.

In the formula (Cp-8), $R_{68}$ and $R_{69}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group. Preferably, $R_{68}$ and $R_{69}$ each are a hydrogen atom, an alkyl group, or an aryl group.

In the formulae (Cp-9), (Cp-10), (Cp-11) and (Cp-12), $R_{70}$ represents an alkyl group, an aryl group or a heterocyclic group; $R_{71}$ represents a halogen atom, an alkyl group, an aryl group, a heterocyclic group, a silyl group, an acylamino group, an alkyl or arylsulfonylamino group, an amino group, an aminocarbonylamino group, an alkylthio group, an arylthio group, an alkoxy group, or an alkoxycarbonylamino group; $R_{72}$ and $R_{73}$ each represent a hydrogen atom or an alkyl group; a indicates an integer falling between 0 and 3; b indicates an integer falling between 0 and 2; c indicates an integer falling between 0 and 4; and when a, b or c is a plural number, $R_{71}$ s may be the same or different. Preferably, $R_{70}$ is an alkyl group or an aryl group; $R_{71}$ is a halogen atom, an alkyl group, or an acylamino group; $R_{72}$ and $R_{73}$ each are a hydrogen atom, a methyl group, or an ethyl group; a is 1 or 2; b is 1 or 2; and c is an integer falling between 0 and 2.

In the formula (Cp-13), $R_{74}$ represents a carbamoyl group, an alkoxycarbonyl group, a cyano group, a sulfamoyl group, an acylamino group, an aminocarbonylamino group, an alkoxycarbonylamino group, or an alkyl or arylsulfonylamino group; $R_{75}$ represents a halogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, or an alkoxycarbonylamino group; d indicates an integer falling between 0 and 4; and when d is a plural number, $R_{75}$'s may be the same or different. Preferably, $R_{74}$ is a carbamoyl group, a sulfamoyl group, or an acylamino group; $R_{75}$ is an acylamino group, an alkyl or arylsulfonylamino group, an aminocarbonylamino group, or an alkoxycarbonylamino group; and d is 0 or 1.

In the formula (Cp-14), $R_{75}$ and d have the same meanings as above; $R_{78}$ and $R_{79}$ have the same meanings as $R_{75}$; $R_{76}$ and $R_{77}$ each represent a cyano group, a sulfamoyl group, an alkyl or arylsulfonyl group, an acyl group, an alkoxycarbonyl group, or a carbamoyl group. Preferably, $R_{75}$ is a halogen atom, an alkyl group, or an aryl group; d is an integer falling between 0 and 2; $R_{78}$ and $R_{79}$ each are a halogen atom, an alkyl group, or an aryl group; and $R_{76}$ and $R_{77}$ each are a cyano group.

In the formula (Cp-15), $R_{75}$ and d have the same meanings as above; $R_{80}$ and $R_{81}$ each represent a cyano group, a sulfamoyl group, an alkyl or arylsulfonyl group, an acyl group, an alkoxycarbonyl group, or a carbamoyl group. Preferably, $R_{75}$ is a halogen atom, an alkyl group, or an aryl group; d is an integer falling between 0 and 2; and $R_{80}$ and $R_{81}$ each are a cyano group.

In the formula (Cp-16), $R_{82}$, $R_{83}$ and $R_{84}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group.

In the formula (Cp-17), $R_{85}$ and $R_{86}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group. Preferably, $R_{85}$ and $R_{86}$ each are a hydrogen atom, an alkyl group, an aryl group, a heterocyclic group, an acylamino group, or an alkyl or arylsulfonylamino group.

In the formulae (Cp-18) through (Cp-20), $R_{87}$ and $R_{88}$ each represent a carbamoyl group, an alkoxycarbonyl group, an aryloxycarbonyl group, a cyano group, a sulfamoyl group, an alkanesulfonyl group, an arenesulfonyl group, or a nitro group; $R_{89}$ and $R_{90}$ each represent a hydrogen atom, an alkyl group, an aryl group, or a heterocyclic group. Preferably, $R_{87}$ is a carbamoyl group, an alkoxycarbonyl group, or a cyano group; $R_{88}$ is a carbamoyl group, an alkoxycarbonyl group, a cyano group, or an alkyl or arylsulfonyl group; $R_{89}$ and $R_{90}$ each are an alkyl group or an aryl group. More preferably, $R_{87}$ is a cyano group; $R_{88}$ is an alkoxycarbonyl group; and $R_{89}$ and $R_{90}$ each are an aryl group.

In the formulae (Cp-21) through (Cp-26), $R_{91}$ and $R_{92}$ each represent an alkyl group, an aryl group, a heterocyclic group, a carbamoyl group, an alkoxycarbonyl group, an aryloxycarbonyl group, a cyano group, a sulfamoyl group, an alkanesulfonyl group, an arenesulfonyl group, or a nitro group; $R_{93}$, $R_{94}$ and $R_{95}$ each represent a hydrogen atom, an alkyl group, an aryl group, a heterocyclic group, an acylamino group, an aminocarbonylamino group, an alkoxycarbonylamino group, an alkyl or arylsulfonylamino group, a halogen atom, an amino group, an alkylthio group, an arylthio group, an alkoxy group, or an aryloxy group. Preferably, $R_{91}$ is an aryl group, a heterocyclic group, a carbamoyl group, an alkoxycarbonyl group or a cyano group; $R_{92}$ is a carbamoyl group, an alkoxycarbonyl group, a cyano group, a sulfamoyl group, or an alkyl or arylsulfonyl group; $R_{93}$, $R_{94}$ and $R_{95}$ each are a hydrogen atom, an alkyl group, an acylamino group, a halogen atom, an amino group, an alkylthio group, or an arylthio group.

In the formula (Cp-27), $R_{97}$, $R_{98}$ and $R_{99}$ each represent a hydrogen atom, a cyano group, a sulfamoyl group, an alkyl or arylsulfonyl group, an acyl group, an alkoxycarbonyl group, or a carbamoyl group; $R_{96}$ represents an amino group, an alkylthio group, an arylthio group, an alkoxy group, or an aryloxy group. Preferably, $R_{97}$, $R_{98}$ and $R_{99}$ each are a hydrogen atom or a cyano group; and $R_{96}$ is an N-arylamino group.

In the formula (Cp-28), $R_{100}$ and $R_{101}$ each represent a hydrogen atom, a perfluoroalkyl group, a cyano group, a nitro group, a sulfamoyl group, an alkyl or arylsulfonyl group, an acyl group, an alkoxycarbonyl group, a carbamoyl group, an alkylthio group, or an arylthio group; $R_{102}$ represents an alkyl group, an aryl group, a heterocyclic group, a sulfamoyl group, an alkyl or arylsulfonyl group, an acyl group, an alkoxycarbonyl group, or a carbamoyl group. Preferably, $R_{100}$ and $R_{101}$ each are a hydrogen atom, a perfluoroalkyl group, a cyano group, a nitro group, an alkyl or arylsulfonyl group, an alkylthio group, or an arylthio group; and $R_{102}$ is an aryl group or a heterocyclic group.

Preferable examples of the groups of $R_{51}$ to $R_{53}$, $R_{61}$ to $R_{69}$, and $R_{70}$ to $R_{102}$ are the same as those mentioned hereinabove for the substituents for the groups of $R^4$ and $R^5$. The groups of $R_{51}$ to $R_{53}$ $R_{61}$ to $R_{69}$, and $R_{70}$ to $R_{102}$ may be optionally substituted, and preferable substituents for them are the same as those mentioned hereinabove for the substituents for the groups of $R^4$ and $R^5$.

Of the groups of (Cp-1) through (Cp-28), preferred are (Cp-1), (Cp-2), (Cp-4), (Cp-5), (Cp-11), (Cp-12), (Cp-18), (Cp-21) and (Cp-22). Especially for magenta dyes, most preferred are pyrazolotriazolazomethine compounds of the general formula (I) with (Cp-4); and for cyan dyes, most preferred are pyrrolotriazolazomethine compounds of the general formula (I) with (Cp-18).

More preferred are pyrrolotriazolazomethine compounds of the general formula (I) with (Cp-18) in which $R_{87}$ is an electron-attracting group having a Hammett's substituent constant $\sigma_p$ of at least 0.30, as their absorption is sharp. Even more preferred are the pyrrolotriazolazomethine compounds in which the sum of the Hammett's substituent constant $\sigma_p$ of $R_{87}$ and $R_{88}$ is at least 0.70, as they exhibit good cyan color.

The oil-soluble azomethine dye expressed by general formula (I) preferably has, at substituent groups thereof, at least one diffusion-resistant group that has a total number of carbon atoms of from 8 to 40 (more preferably, from 10 to 30). The oil-soluble azomethine dye represented by general formula (I) may be a bis-type, a tris-type, a telomer-type, or a polymer-type compound having two or more dye skeletons in the molecule. In this case, the range of carbon atoms may be other than those stipulated above.

The oil-soluble azomethine dye represented by general formula (I) may have, in the molecule thereof, an atomic group which has an effect of suppressing color fading. Preferable atomic groups that have the effect of suppressing color fading are atomic groups disclosed in JP-A No. 3-205189.

Specific examples of the oil-soluble azomethine dye represented by general formula (I) (example compounds M-1 through M-16 and example compounds C-1 through C-9) are given hereinafter. However, the oil-soluble dyes used in the present invention are not limited to these concrete examples.

M-1

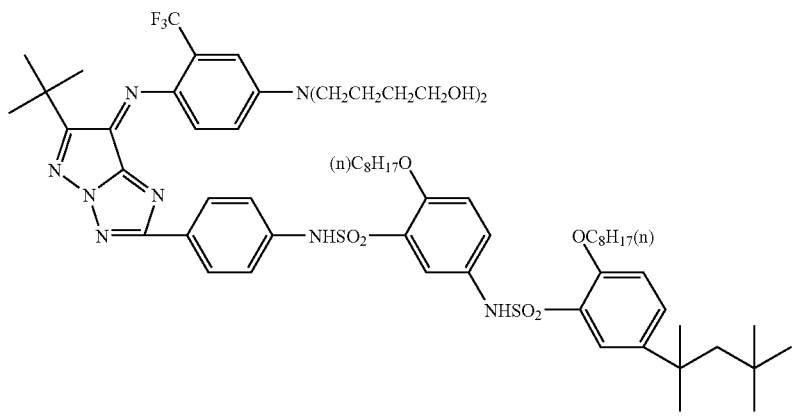

M-2

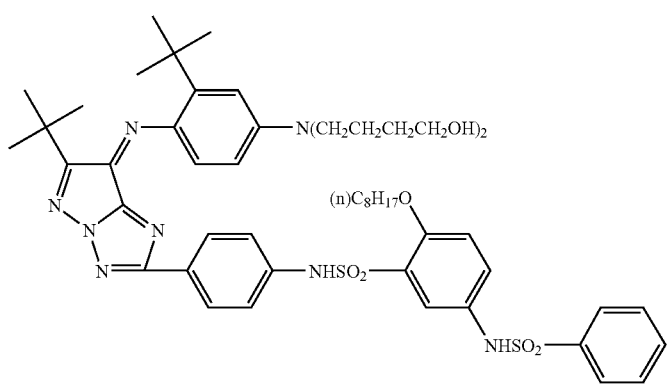

M-3

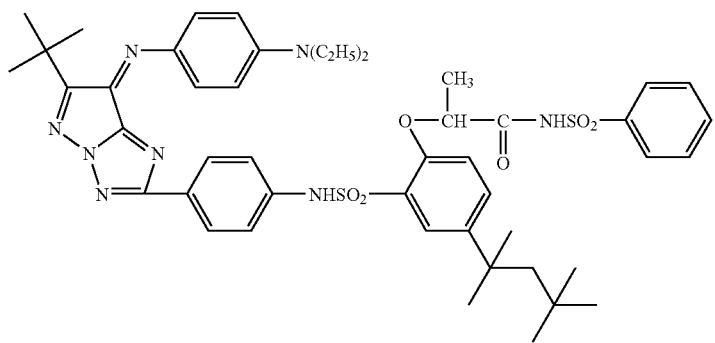

-continued
M-4
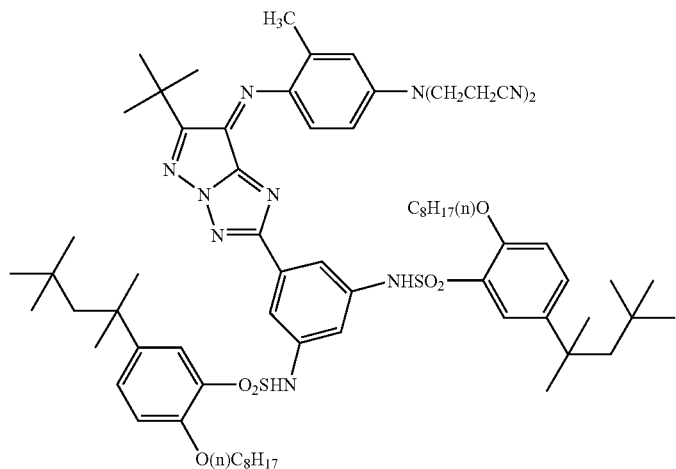
M-5
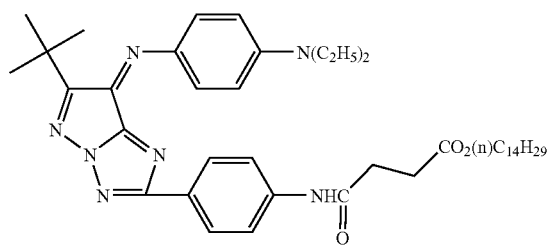
M-6
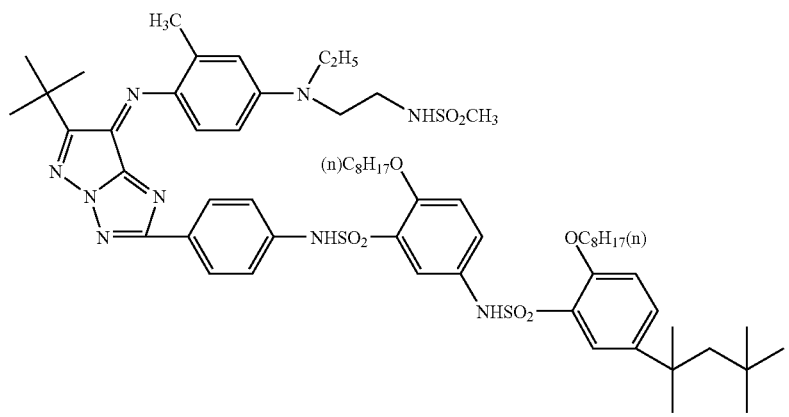
M-7
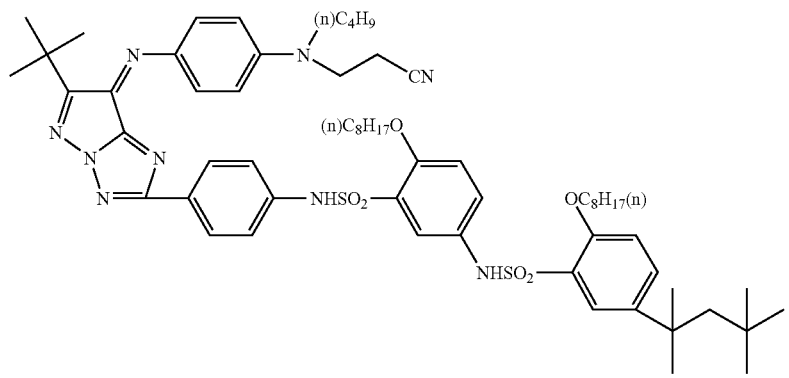

-continued
M-8
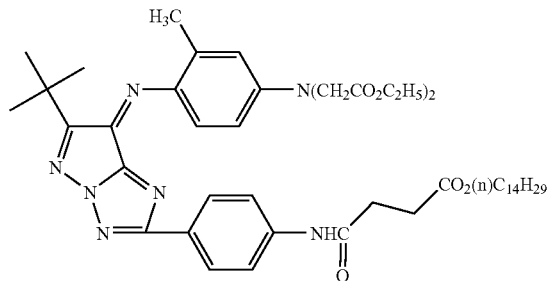
M-9
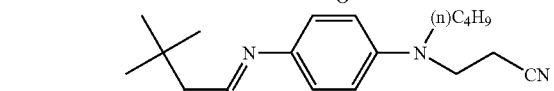
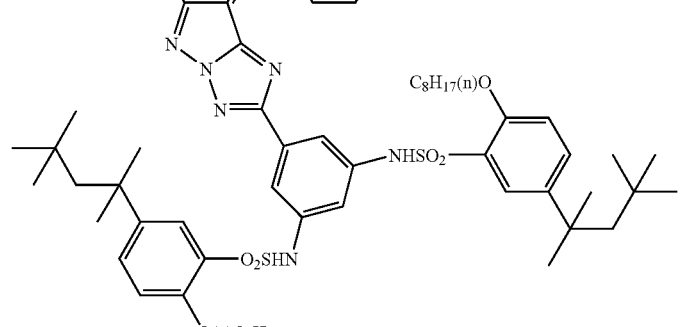
M-10
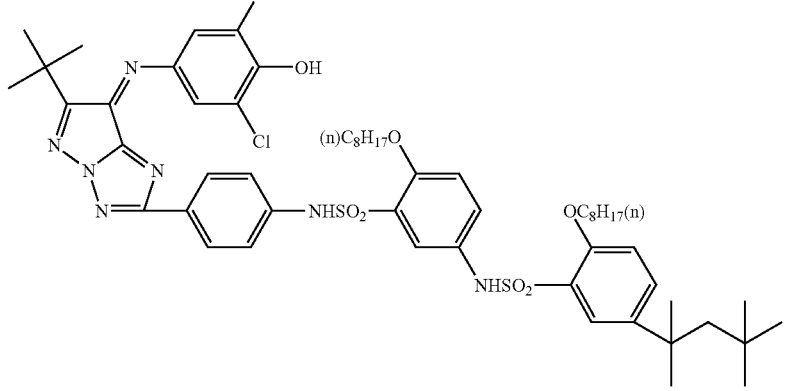
M-11
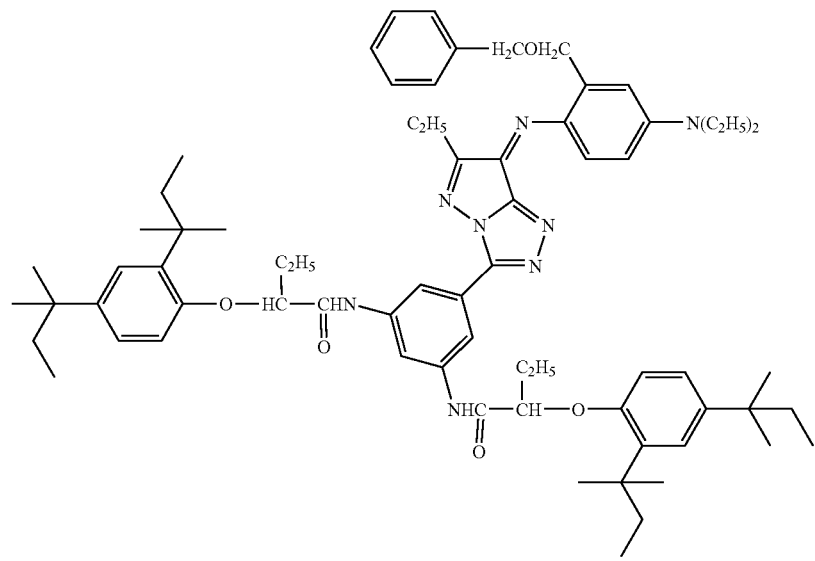

-continued
M-12
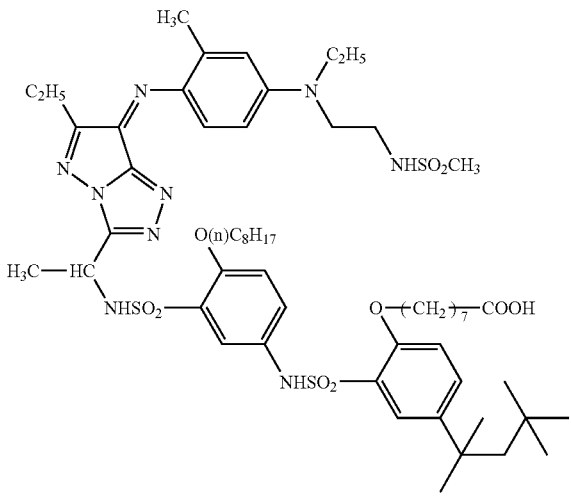
M-13
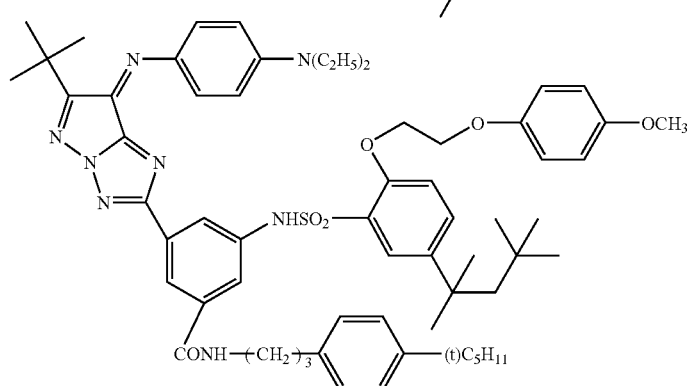
M-14
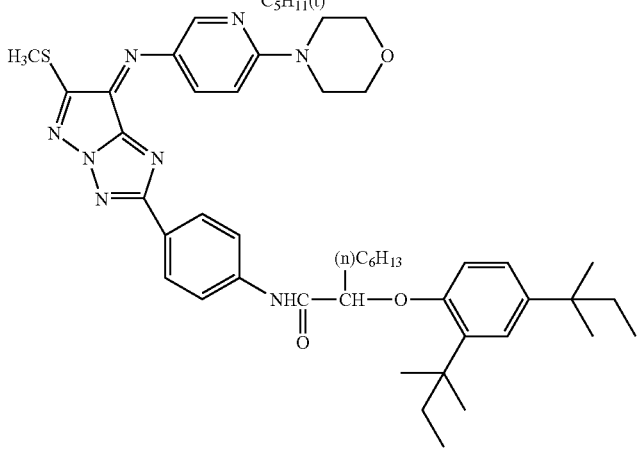
M-15
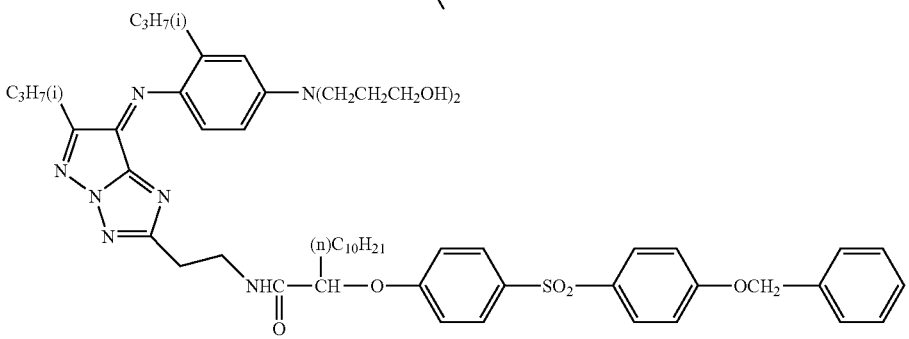

-continued
M-16
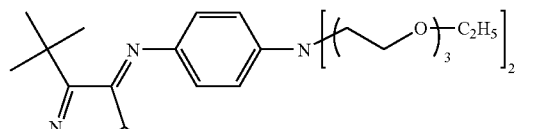
C-1
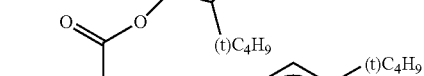
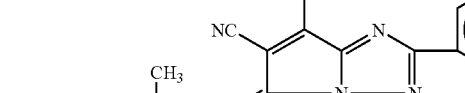
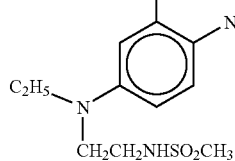
C-2
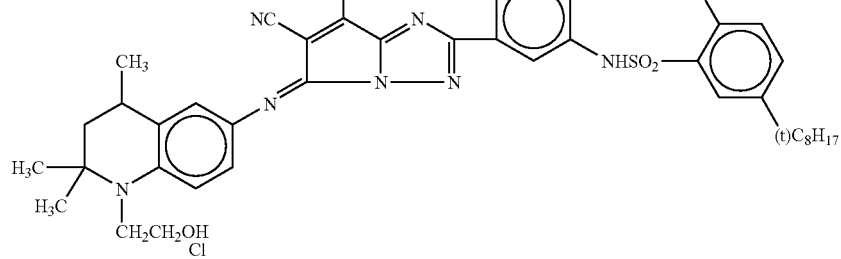
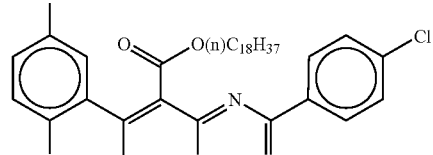
C-3
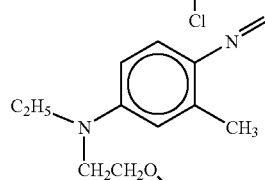
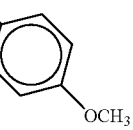

-continued
C-4
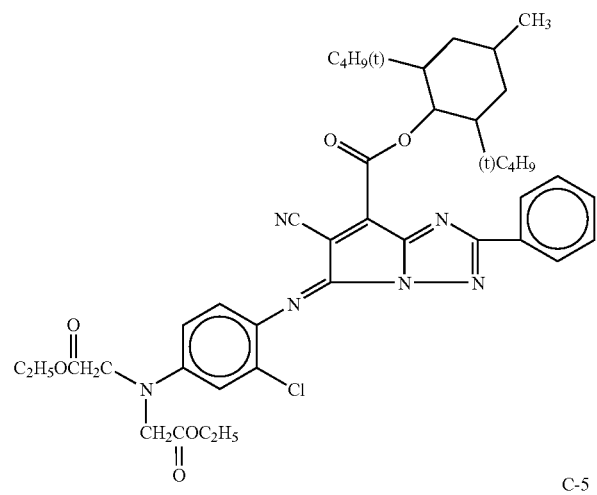
C-5
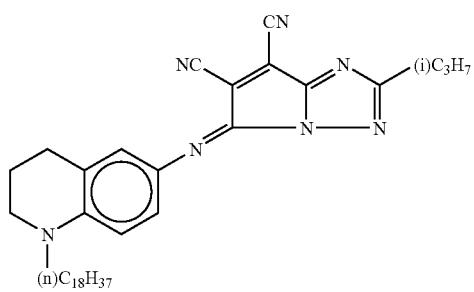
C-6
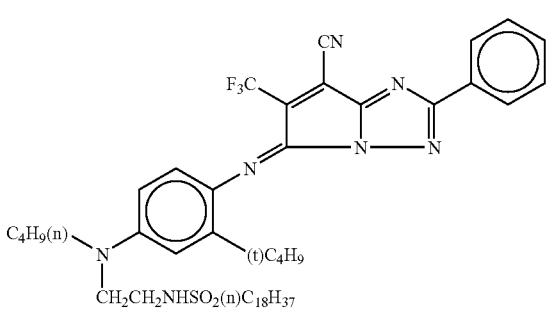
C-7
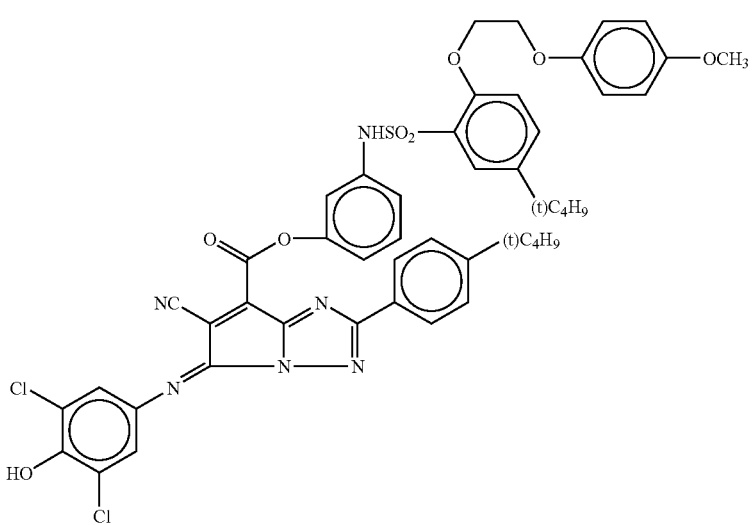
C-8
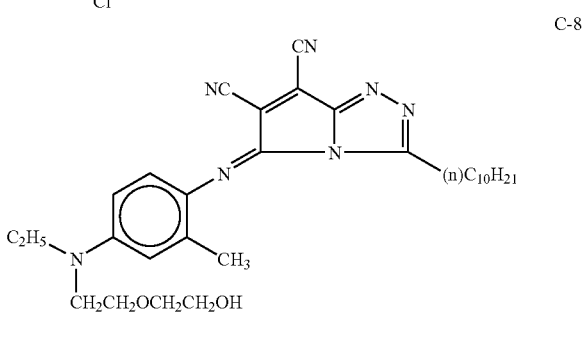
C-9
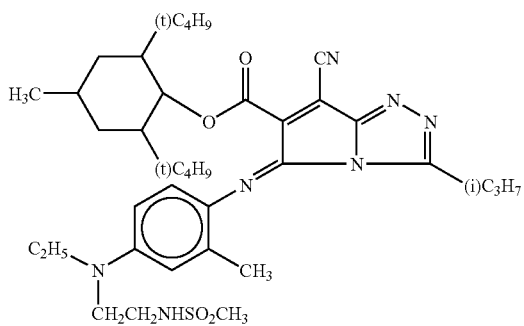

Specific examples of the dye represented by general formula (I) are disclosed in Japanese Patent Applications Nos. 2000-78491 and 11-365188, and in Japanese Patent Application No. 2000-80259 (example compounds D-1 through D-34). However, the dye represented by general formula (I) is not limited to the examples disclosed in these publications.

The dye represented by general formula (I) can be synthesized with reference to the synthesis methods disclosed in JP-A Nos. 4-126772, 5-177959, 9-292679, 10-62926, 11-158047, Japanese Patent Application Publication (JP-B) No. 7-94180 and the like, and Japanese Patent Application Nos. 2000-78491 and 11-365188.

-Block Copolymer-

In the present invention, the block copolymer is a block copolymer which is structured from a hydrophobic segment A and a hydrophilic segment B. The hydrophobic segment A is a segment wherein a polymer formed only from segment A has the characteristic of not dissolving in water or methanol. The hydrophilic segment B is a segment wherein a polymer formed only from segment B has the characteristic of dissolving in water or methanol. Examples of types of the block copolymer are an AB type, a $B^1AB^2$ type (where the two hydrophilic segments $B^1$ and $B^2$ may be the same or different), and an $A^1BA^2$ type (where the two hydrophobic segments $A^1$ and $A^2$ may be the same or different). From the standpoint of a good dispersing property, AB type or $B^1AB^2$ type block copolymers are preferable. From the standpoint of manufacturing suitability, the AB type or a BAB type (where the two hydrophilic segments of the $B^1AB^2$ type are the same) are more preferable, and the AB type is particularly preferable.

Each of the hydrophobic segment and the hydrophilic segment may be selected from any of conventionally known polymers such as vinyl polymers obtained by polymerizing vinyl monomers, polyethers, condensation polymers and the like. However, vinyl polymers are preferable from the standpoint of obtaining a great difference between the hydrophobicity and hydrophilicity of the segments, and from the standpoint of manufacturing suitability.

Examples of the vinyl monomer A that forms the hydrophobic segment A are the following: acrylic esters and methacrylic esters (the ester group is a substituted or unsubstituted aliphatic ester group or a substituted or unsubstituted aromatic ester group, e.g., ester groups such as a methyl group, ethyl group, n-propyl group, isopropyl group, n-butyl group, isobutyl group, sec-butyl group, tert-butyl group, amyl group, hexyl group, 2-ethylhexyl group, tert-octyl group, 2-chloroethyl group, 4-bromobutyl group, cyanoethyl group, cyclohexyl group, benzyl group, butoxymethyl group, 3-methoxybutyl group, 2-(2-methoxyethoxy)ethyl group, 2-(2-butoxyethoxy)ethyl group, 2,2,2-tetrafluoroethyl group, 1H,1H,2H,2H-perfluorodecyl group, 4-butylphenyl group, phenyl group, 2,4,5-tetramethylphenyl group, 4-chlorophenyl group, and the like); acrylamides and methacrylamides, specifically, N-mono-substituted acrylamide, N-di-substituted acrylamide, N-mono-substituted methacrylamide, N-di-substituted methacrylamide (the substituents of the mono-substituents and the di-substituents are substituted or unsubstituted aliphatic groups and substituted or unsubstituted aromatic groups, and examples of the substituents include a methyl group, ethyl group, n-propyl group, isopropyl group, n-butyl group, isobutyl group, sec-butyl group, tert-butyl group, pentyl group, hexyl group, 2-ethylhexyl group, tert-octyl group, cyclohexyl group, benzyl group, alkoxymethyl group, alkoxyethyl group, 4-butylphenyl group, phenyl group, 2,4,5-tetramethylphenyl group, 4-chlorophenyl group, and the like); olefins, specifically dicyclopentadiene, ethylene, propylene, 1-butene, 1-pentene, vinyl chloride, vinylidene chloride, isoprene, chloroprene, butadiene, 2,3-dimethylbutadiene, and the like; styrenes, specifically styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, methyl ester vinyl benzoate, and the like; and vinyl ethers, specifically methyl vinyl ethers, butyl vinyl ethers, hexyl vinyl ethers, methoxyethyl vinyl ethers, and the like, and other examples of the monomer include butyl crotonate, hexyl crotonate, dimethyl itaconate, dibutyl itaconate, diethyl maleate, dimethyl maleate, dibutyl maleate, diethyl fumarate, dimethyl fumarate, dibutyl fumarate, methyl vinyl ketone, phenyl vinyl ketone, methoxyethyl vinyl ketone, N-vinyl oxazolidone, N-vinyl pyrrolidone, vinylidene chloride, methylene malononitrile, vinylidene, diphenyl-2-acryloyloxyethylphosphate, diphenyl-2-methacryloyloxyethylphosphate, dibutyl-2-acryloyloxyethylphosphate, dioctyl-2-methacryloyloxyethylphosphate, and the like.

Among these, acrylic esters and methacrylic esters whose ester group is an unsubstituted aliphatic group, an alkyl-substituted aromatic group or an aromatic group; N-mono-substituted acrylamides, N-di-substituted acrylamides, N-mono-substituted methacrylamides, and N-di-substituted methacrylamides whose substituent is an unsubstituted aliphatic group, an alkyl-substituted phenyl group or a phenyl group are preferable. Acrylic esters and methacrylic esters whose ester group is an aliphatic group having from 1 to 20 carbon atoms, an alkyl-substituted aromatic group having from 7 to 30 carbon atoms, or an aromatic group are more preferable. Acrylic esters and methacrylic esters whose ester group is an aliphatic group having from 1 to 20 carbon atoms, an alkyl-substituted phenyl group having from 7 to 30 carbon atoms, or a phenyl group are even more preferable. Acrylic esters and methacrylic esters whose ester group is an aliphatic group having from 2 to 20 carbon atoms or an alkyl-substituted phenyl group having from 7 to 30 carbon atoms are particularly preferable.

Examples of the vinyl monomer B that forms the hydrophilic segment B are the following: acrylic acid, methacrylic acid, acrylic esters and methacrylic esters having a hydrophilic substituent at the ester region thereof (examples of the hydrophilic substituent are a hydroxy group, carboxyl group, amino group, and the like), acrylamide, methacrylamide, N-mono-substituted acrylamide, N-di-substituted acrylamide, N-mono-substituted methacrylamide, N-di-substituted methacrylamide, and the like.

Among these, acrylic acid, methacrylic acid, acrylic esters and methacrylic esters having a hydroxy group (examples of ester groups having a hydroxy group are a 2-hydroxyethyl group, 2,3-dihydroxypropyl group, 2-hydroxypropyl group, 3-hydroxypropyl group, and the like), acrylamide, methacrylamide, and an N-mono-substituted acrylamide, N-di-substituted acrylamide, N-mono-substituted methacrylamide, or N-di-substituted methacrylamide whose total number of carbon atoms of the substituent on the nitrogen is from 1 to 10 are preferable. Acrylic acid, methacrylic acid, 2-hydroxyethylacrylate, 2-hydroxyethylmethacrylate, 2,3-dihydroxypropylacrylate, and 2,3-dihydroxypropylmethacrylate are more preferable. Acrylic acid, methacrylic acid, 2-hydroxyethylacrylate, 2,3-dihydroxypropylacrylate, and 2,3-dihydroxypropylmethacrylate are even more preferable, and acrylic acid and methacrylic acid are particularly preferable.

The vinyl monomer A which forms the hydrophobic segment A may include the aforementioned vinyl monomer B provided that such inclusion does not impair the hydrophobic characteristic. The mole ratio of the vinyl monomer A and the vinyl monomer B contained in the hydrophobic segment A is preferably from 100:0 to 60:40.

The vinyl monomer B which forms the hydrophilic segment B may include the aforementioned vinyl monomer A provided such inclusion does not impair the hydrophilic characteristic. The mole ratio of the vinyl monomer B and the vinyl monomer A contained in the hydrophilic segment B is preferably from 100:0 to 60:40.

For both the vinyl monomer A and the vinyl monomer B, one type or two or more types thereof may be used. The vinyl monomer A and the vinyl monomer B are selected in accordance with respective objects thereof (e.g., adjustment of the amount of acid contained, adjustment of the glass transition temperature (Tg), adjustment of the solubility into the organic solvent or water, and adjustment of the stability of the dispersion).

It is preferable that the block copolymer has an ionic group in the structure thereof. Examples of the ionic group include carboxyl groups, sulfo groups, sulfino groups, phosphino groups, and the like. Among these, it is preferable that the block copolymer has a carboxyl group in the structure.

The contained amount of the ionic group is preferably 0.2 to 5.0 mmol/g, and is more preferably 0.3 to 4.5 mmol/g, and is especially preferably 0.5 to 3.5 mmol/g. If the contained amount of the ionic group is too small, suitability for emulsification is poor. If the contained amount of the ionic group is too large, the water solubility may be high such that the dispersability of the oil-soluble dye deteriorates.

In the block copolymer, the ionic group such as a carboxyl group or the like may form an alkali metal ion (e.g., $Na+$, $K+$, or the like) or an ammonium ion.

The molecular weight (Mn) of the block copolymer is preferably from 1,000 to 100,000, is more preferably from 2,000 to 80,000, is even more preferably from 3,000 to 50,000, and is particularly preferably from 3,000 to 20,000. If the molecular weight is lower than 1,000, it is difficult to obtain a stable dispersion. If the molecular weight exceeds 100,000, the solubility in the organic solvent deteriorates and, even if the block copolymer dissolves, the viscosity of the solution increases such that dispersion becomes difficult, which is not preferable.

Specific examples (P-1 through P-50, and P-101 through P-121) of the block copolymer are given hereinafter. It is to be noted that the block copolymer used in the present invention is not in any way limited to these examples.

TABLE 1

AB

| No. | Hydrophobic Segment A | Number of Moles | Hydrophilic Segment B | Number of Moles | Molecular Weight | Contained Amount of Acid |
|---|---|---|---|---|---|---|
| P-1 | methyl methacrylate | 30 | methacrylic acid | 10 | 4000 | 2.52 |
| P-2 | methyl methacrylate | 30 | acrylic acid | 8 | 3700 | 2.17 |
| P-3 | methyl methacrylate | 30 | methacrylic acid/ methyl methacrylate | 10/5 | 4500 | 2.24 |
| P-4 | ethyl methacrylate | 20 | methacrylic acid | 10 | 3200 | 3.08 |
| P-5 | ethyl methacrylate | 40 | acrylic acid | 15 | 5700 | 2.61 |
| P-6 | ethyl methacrylate | 40 | methacrylic acid | 15 | 6000 | 2.52 |
| P-7 | ethyl methacrylate | 40 | methacrylic acid/ ethyl methacrylate | 20/5 | 7000 | 2.87 |
| P-8 | n-butyl methacrylate | 20 | methacrylic acid | 10 | 3800 | 2.63 |
| P-9 | n-butyl methacrylate | 40 | methacrylic acid | 4 | 6100 | 0.65 |
| P-10 | n-butyl methacrylate | 40 | methacrylic acid | 40 | 9200 | 4.33 |
| P-11 | n-butyl methacrylate | 100 | methacrylic acid | 45 | 18200 | 2.47 |
| P-12 | n-butyl methacrylate | 30 | methacrylic acid/ n-butyl methacrylate | 10/5 | 5900 | 1.68 |
| P-13 | n-butyl methacrylate | 20 | methacrylic acid/ n-butyl methacrylate | 20/10 | 6100 | 3.29 |
| P-14 | n-butyl methacrylate | 30 | methacrylic acid/ n-butyl methacrylate | 20/10 | 7500 | 2.66 |
| P-15 | n-butyl methacrylate | 20 | methacrylic acid/ n-butyl methacrylate | 15/10 | 5700 | 2.65 |
| P-16 | n-butyl methacrylate | 60 | methacrylic acid/ n-butyl methacrylate | 40/20 | 14900 | 2.68 |
| P-17 | n-butyl methacrylate | 30 | methacrylic acid/2-hydroxyethylmethacrylate | 15/10 | 7000 | 2.16 |
| P-18 | n-butyl methacrylate | 40 | methacrylic acid/2,3-dihydroxypropylmethacrylate | 30/10 | 10000 | 3.01 |
| P-19 | n-butyl methacrylate/ methyl methacrylate | 20/10 | methacrylic acid | 15 | 5200 | 2.86 |
| P-20 | n-butyl methacrylate/ methyl methacrylate | 20/10 | methacrylic acid/ methacrylate | 15/10 | 6200 | 2.40 |
| P-21 | isobutyl methacrylate | 30 | methacrylic acid | 10 | 5200 | 1.91 |
| P-22 | isobutyl methacrylate | 30 | methacrylic acid/ n-butylmethacrylate | 10/5 | 5900 | 1.68 |
| P-23 | isobutyl methacrylate | 30 | methacrylic acid/ N-dimethylacrylamide | 10/5 | 5700 | 1.75 |
| P-24 | isobutyl methacrylate | 30 | methacrylic acid/2-dimethylaminoethylacrylate | 10/3 | 5700 | 1.77 |
| P-25 | sec-butyl methacrylate | 20 | methacrylic acid | 10 | 3800 | 2.63 |

TABLE 2

AB

| No. | Hydrophobic Segment A | Number of Moles | Hydrophilic Segment B | Number of Moles | Molecular Weight | Contained Amount of Acid |
|---|---|---|---|---|---|---|
| P-26 | n-hexyl methacrylate | 20 | methacrylic acid | 10 | 4400 | 2.29 |
| P-27 | n-hexyl methacrylate | 30 | methacrylic acid | 25 | 7400 | 3.40 |
| P-28 | n-hexyl acrylate | 30 | acrylic acid | 25 | 6500 | 3.83 |
| P-29 | n-hexyl methacrylate/ methyl methacrylate | 20/10 | methacrylic acid | 20 | 6200 | 3.21 |
| P-30 | n-hexyl methacrylate/ methyl methacrylate | 10/20 | methacrylic acid | 15 | 5100 | 2.94 |
| P-31 | n-hexyl methacrylate/ n-butyl methacrylate | 20/10 | methacrylic acid/ methyl methacrylate | 15/10 | 7200 | 2.08 |
| P-32 | n-hexyl methacrylate | 30 | methacrylic acid/ 2-hydroxyethyl methacrylate | 20/10 | 8200 | 2.43 |
| P-33 | n-hexyl methacrylate | 30 | methacrylic acid/ 2,3-dihydroxypropyl methacrylate | 20/10 | 8500 | 2.34 |
| P-34 | n-hexyl methacrylate/ 2-chloroethyl methacrylate | 20/10 | methacrylic acid/ 2,3-dihydroxypropyl methacrylate | 20/10 | 8300 | 2.41 |
| P-35 | 2-ethylhexyl methacrylate | 20 | methacrylic acid | 10 | 4900 | 2.03 |
| P-36 | 2-ethylhexyl methacrylate | 30 | acrylic acid | 15 | 7100 | 2.10 |
| P-37 | 2-ethylhexyl methacrylate | 30 | methacrylic acid | 20 | 7800 | 2.57 |
| P-38 | 2-ethylhexyl methacrylate | 30 | methacrylic acid/ n-butyl methacrylate | 15/5 | 8100 | 1.86 |
| P-39 | 2-ethylhexyl methacrylate | 30 | methacrylic acid/ methyl methacrylate | 15/10 | 8300 | 1.80 |
| P-40 | 2-ethylhexyl methacrylate/ n-butyl methacrylate | 25/10 | methacrylic acid | 20 | 8200 | 2.44 |
| P-41 | 2-ethylhexyl methacrylate/ n-butyl methacrylate | 10/30 | methacrylic acid | 25 | 8500 | 2.94 |
| P-42 | 2-ethylhexyl methacrylate/ ethyl methacrylate | 10/20 | methacrylic acid | 20 | 6100 | 3.29 |
| P-43 | n-octyl methacrylate | 30 | methacrylic acid | 20 | 7800 | 2.57 |
| P-44 | n-octyl methacrylate | 30 | methacrylic acid/ n-butyl methacrylate | 15/5 | 8100 | 1.86 |
| P-45 | n-decyl methacrylate | 30 | methacrylic acid | 40 | 10300 | 3.87 |
| P-46 | n-decyl methacrylate | 30 | methacrylic acid/ methyl methacrylate | 30/10 | 10500 | 2.86 |
| P-47 | n-lauryl methacrylate | 30 | methacrylic acid | 40 | 11200 | 3.58 |
| P-48 | n-lauryl methacrylate/ ethyl methacrylate | 20/10 | methacrylic acid | 20 | 8100 | 2.48 |
| P-49 | n-lauryl methacrylate/ n-butyl methacrylate | 20/10 | methacrylic acid | 20 | 8300 | 2.40 |
| P-50 | n-lauryl methacrylate/ n-butyl methacrylate | 20/10 | methacrylic acid/ methacrylate | 15/10 | 8900 | 1.68 |

TABLE 3

BAB

| No. | Hydrophobic Segment A | Number of Moles | Hydrophilic Segment B* | Number of Moles* | Molecular Weight | Contained Amount of Acid |
|---|---|---|---|---|---|---|
| P-101 | methyl methacrylate | 30 | methacrylic acid | 5 | 4000 | 2.52 |
| P-102 | ethyl methacrylate | 20 | methacrylic acid | 10 | 4100 | 4.87 |
| P-103 | ethyl methacrylate | 40 | methacrylic acid/ ethyl methacrylate | 15/5 | 8400 | 3.58 |
| P-104 | n-butyl methacrylate | 20 | methacrylic acid | 10 | 4700 | 4.29 |
| P-105 | n-butyl methacrylate | 40 | methacrylic acid | 4 | 6500 | 1.24 |
| P-106 | n-butyl methacrylate | 100 | methacrylic acid | 45 | 22100 | 4.08 |
| P-107 | n-butyl methacrylate | 30 | methacrylic acid/ n-butyl methacrylate | 10/5 | 7500 | 2.66 |
| P-108 | n-butyl methacrylate | 20 | methacrylic acid/ n-butyl methacrylate | 15/10 | 8400 | 3.58 |
| P-109 | n-butyl methacrylate | 30 | methacrylic acid/ n-butyl methacrylate | 20/10 | 10700 | 3.75 |
| P-110 | n-butyl methacrylate | 30 | methacrylic acid/ 2-hydroxyethylmethacrylate | 15/10 | 9600 | 3.14 |
| P-111 | isobutyl methacrylate | 30 | methacrylic acid | 10 | 6100 | 3.29 |
| P-112 | isobutyl methacrylate | 30 | methacrylic acid/ n-butylmethacrylate | 10/5 | 7500 | 2.66 |
| P-113 | sec-butyl methacrylate | 20 | methacrylic acid | 4 | 3600 | 2.20 |
| P-114 | n-hexyl methacrylate | 30 | methacrylic acid | 10 | 6900 | 2.89 |

TABLE 3-continued

BAB

| No. | Hydrophobic Segment A | Number of Moles | Hydrophilic Segment B* | Number of Moles* | Molecular Weight | Contained Amount of Acid |
|---|---|---|---|---|---|---|
| P-115 | n-hexyl methacrylate/ methyl methacrylate | 10/20 | methacrylic acid | 3 | 4300 | 1.39 |
| P-116 | 2-ethylhexyl methacrylate | 30 | acrylic acid | 10 | 7500 | 2.67 |
| P-117 | 2-ethylhexyl methacrylate | 30 | methacrylic acid/ methyl methacrylate | 15/10 | 10600 | 2.82 |
| P-118 | n-decyl methacrylate | 30 | methacrylic acid | 30 | 12100 | 4.98 |
| P-119 | n-decyl methacrylate | 30 | methacrylic acid/ methyl methacrylate | 25/10 | 13200 | 3.79 |
| P-120 | n-lauryl methacrylate | 30 | methacrylic acid | 20 | 11200 | 3.58 |
| P-121 | n-lauryl methacrylate/ ethyl methacrylate | 20/10 | methacrylic acid | 10 | 8100 | 2.48 |

*The Bs at both sides of the BAB block are the same components and have the same number of moles.

The block copolymer can be synthesized by using living radical polymerization or living ion polymerization by using, if needed, a method which protects the carboxyl group or the like. Further, the block copolymer can be synthesized by radical polymerization from the terminal functional group polymers and connecting the terminal functional group polymers. Among these methods, living radical polymerization and living ion polymerization are preferable from the standpoints of control of the molecular weight and yield of the block copolymer. Methods for preparing block copolymers are disclosed in, for example, "Synthesis and Reactions of Polymers (1)" ("*Kobunshi no Gosei to Hanno (1)*") (edited by the Polymer Society (Kobunshi Gakkai), published by Kyoritsu Shuppan Co., Ltd. (1992)), "Precise Polymerization" ("*Seimitsu Jyugo*") (edited by the Japan Chemical Society (Nihon Kagakkai), published by Gakkai Shuppan Center (1993)), "Synthesis/ Reactions of Polymers (1)" ("*Kobunshi no Gosei/Hanno (1)*") (edited by the Polymer Society (Kobunshi Gakkai), published by Kyoritsu Shuppan Co., Ltd. (1995)), "Telechelic Polymers: Synthesis and Properties, and Application" ("*Terekerikku Porima: Gosei to Seishitsu, Ouyou*") (R. Jerome et al., Prog. Polym. Sci., Vol. 16, pp. 837–906 (1991)), "Synthesis of Block and Graft Copolymers by Light" ("*Hikari ni yoru Burokku, Gurafuto Kyojyugotai no Gosei*") (Y. Yagch et al., Prog. Polym. Sci., Vol. 15, pp. 551–601 (1990)), U.S. Pat. No. 5,085,698, and the like.

Next, an example of a method for preparing the block copolymer will be described. However, the block copolymer used in the present invention is not limited to the block copolymer prepared by the following preparation example.

<Preparation Example>

A mixed solution of 70 ml of tetrahydrofuran (THF), 0.8 ml of a THF solution containing 0.1 mol/liter of tetrabutylammonium fluoride, and 1.35 g of dimethylketene methyltrimethylsilylacetal was prepared. Next, at room temperature, a mixed solution of 11.0 g of butyl methacrylate and 24.5 g of tetramethylsilyl methacrylate was added over 45 minutes, and stirring was carried out for 30 minutes. Further, 22.0 g of butyl methacrylate was added over 30 minutes, and stirring was carried out for a further 4 hours. 5.7 g of methanol was added, and stirring was carried out for 1 hour. Thereafter, 110 ml of isopropyl alcohol was added. A resultant solution was heated to 80 to 90° C. A generated distillate was removed, and 193 g of a solution containing 40% by mass of the target block copolymer P-13 was obtained.

Preparation of Colored Particulate Dispersion

The colored particulate dispersion of the present invention can be prepared by dispersing, in a water-based medium (an aqueous liquid containing at least water), colored particulates containing the above-described oil-soluble dye and the above-described block copolymer. Specific examples are a method in which a dispersion of the block copolymer is prepared in advance and this dispersion is impregnated into the oil-soluble dye, a co-emulsification dispersion method, and the like.

Among these, a co-emulsification dispersion method is preferable. An example of a suitable co-emulsification dispersion method is a method in which an organic solvent phase, which contains the block copolymer and the oil-soluble dye, is emulsified and made into particulates by either adding water to the organic solvent phase or adding the organic solvent phase into water.

Here, the method in which a dispersion of the block copolymer is prepared, and the oil-soluble dye is impregnated into this dispersion will be explained.

A first example of this method includes a first step of preparing a block copolymer dispersion; a second step of preparing a dye solution in which the oil-soluble dye is dissolved in an organic solvent; and a third step of preparing a colored particulate dispersion by mixing together the dye solution and the block copolymer dispersion.

A second example of this method includes a first step of preparing a block copolymer dispersion; a second step of preparing a dye solution in which the oil-soluble dye is dissolved in an organic solvent, and mixing the dye solution together with a liquid containing at least water so as to prepare a dye particulate dispersion solution; and a third step of mixing together the block copolymer dispersion and the dye particulate dispersion solution to prepare a colored particulate dispersion.

Next, the co-emulsification dispersion method will be described.

A first example of this method includes a first step of preparing a block copolymer dye solution in which the oil-soluble dye and the block copolymer are dissolved in an organic solvent; and a second step of mixing together the block copolymer dye solution and a liquid containing at least water, so as to prepare a colored particulate dispersion.

A second example of this method includes a first step of preparing a dye solution in which the oil-soluble dye is dissolved in an organic solvent; a second step of preparing a block copolymer solution in which the block copolymer is dissolved; and a third step of mixing together the dye solution and the block copolymer solution and a liquid containing at least water, so as to prepare the colored particulate dispersion.

A third example of this method includes a first step of preparing a dye solution in which the oil-soluble dye is dissolved in an organic solvent, and mixing together this dye solution and a liquid containing at least water so as to prepare a dye particulate dispersion solution; a second step of preparing a block copolymer solution in which the block copolymer is dissolved, and mixing together the block copolymer solution with a liquid containing at least water so as to prepare a block copolymer particulate dispersion solution; and a third step of mixing together the dye particulate dispersion solution and the block copolymer particulate dispersion solution so as to prepare the colored particulate dispersion.

A fourth example of this method includes a first step of preparing a block copolymer solution in which the block copolymer is dissolved in an organic solvent; a second step of preparing a dye solution in which the oil-soluble dye is dissolved, and mixing together the dye solution with a liquid containing at least water so as to prepare a dye particulate dispersion solution; and a third step of mixing together the block copolymer solution and the dye particulate dispersion solution so as to prepare the colored particulate dispersion.

In the colored particulate dispersion, the amount of the block copolymer which is used is preferably 10 to 1,000 parts by mass and more preferably 20 to 400 parts by mass with respect to 100 parts by mass of the oil-soluble dye.

If the used amount of the block copolymer is less than 10 parts by mass, fine and stable dispersion is difficult. If the used amount of the block copolymer exceeds 1,000 parts by mass, the ratio of the oil-soluble dye within the colored particulate dispersion is small, and there is a lack of leeway in compounding design when the colored particulate dispersion is to be used as a water-based ink.

In the colored particulates, it is preferable for the oil-soluble dye to be dispersed in the block copolymer.

The contained amount of the colored particulates in the colored particulate dispersion is preferably 1 to 45% by mass, and more preferably 2 to 30% by mass. The contained amount can be appropriately adjusted by dilution, evaporation, ultrafiltration, or the like.

The average particle diameter of the colored particulates is preferably 1 to 500 nm, more preferably 3 to 300 nm, even more preferably 5 to 150 nm, and particularly preferably 5 to 100 nm. The average particle diameter can be adjusted by centrifugal separation, filtration, or the like.

-Water Based Medium-

The water based medium is water, or a water soluble organic solvent, or a mixture of a water miscible liquid (such as sulfuric acid or the like) and water. The amount of water contained in the water based medium is preferably from 50 to 100%. Further, a water soluble compound such as an inorganic salt (e.g., sodium chloride, lithium hydroxide, or the like) may be dissolved.

Components, other than water, contained in the water based medium maybe removed or decreased by dialysis or ultrafiltration, after a water insoluble coloring agent has been dispersed, or after the water based coloring particulate dispersion has been prepared. If the components, other than water, contained in the water based medium are water soluble organic solvents which are necessary for the ink for ink jet recording of the present invention, there is no need to remove them.

The water soluble organic solvent is preferably a water soluble organic solvent whose vapor pressure is lower than that of water. Specific examples include polyhydric alcohols such as ethylene glycol, propylene glycol, diethylene glycol, triethylene glycol, polyethylene glycol, thiodiglycol, dithiodiglycol, 2-methyl-1,3-propanediol, 1,2,6-hexanetriol, acetylene glycol derivatives, glycerin, trimethylolpropane, and the like; lower alkylethers of polyhydric alcohols such as ethylene glycol monomethyl (or ethyl) ether, diethylene glycol monomethyl (or ethyl) ether, triethylene glycol monoethyl (or butyl) ether, and the like; heterocycles such as 2-pyrrolidone, N-methyl-2-pyrrolidone, 1,3-dimethyl-2-imidazolidinone, N-ethylmorpholine, and the like; sulfur containing compounds such as sulfolane, dimethyl sulfoxide, 3-sulfolene, and the like; and multifunctional compounds such as diacetone alcohol, diethanol amine, triethanol amine, and the like. Among these, ethylene glycol, diethylene glycol, triethylene glycol, propylene glycol, glycerin, 2-pyrrolidone, and triethanol amine are preferable.

A single one of the above water soluble organic solvents may be used, or two or more types may be used in combination. The water soluble organic solvents are preferably each contained in the ink in an amount of 0.1 to 20% by mass, and more preferably 0.5 to 15% by mass.

The organic solvent used in preparing the colored particulate dispersion is not particularly limited, and can be appropriately selected on the basis of solubility of the oil-soluble polymer and the block copolymer. Examples of the organic solvent include ketone solvents such as acetone, methylethyl ketone, diethyl ketone, and the like; alcohol solvents such as methanol, ethanol, 2-propanol, 1-propanol, 1-butanol, tert-butanol, and the like; chlorine solvents such as chloroform, methylene chloride, and the like; aromatic solvents such as benzene, toluene, and the like; ester solvents such as ethyl acetate, butyl acetate, isopropyl acetate, and the like; ether solvents such as diethyl ether, tetrahydrofuran, dioxane, and the like; glycol ether solvents such as ethylene glycol monomethyl ether, ethylene glycol dimethyl ether, and the like; and the like.

A single one of these solvents may be used, or two or more of these solvents may be used in combination.

The amount of the organic solvent used is not particularly limited provided that it falls within a range so as not to impair the effects of the present invention. However, the used amount of the organic solvent is preferably 10 to 2,000 parts by mass and more preferably 100 to 1,000 parts by mass with respect to 100 parts by mass of the block copolymer.

If the amount of the organic solvent used is less than 10 parts by mass, it is difficult for the colored particulates to disperse finely and stably. If the used amount of the organic solvent exceeds 2,000 parts by mass, desolvating and concentrating processes for removing the organic solvent are required, and there is a lack of leeway in compounding design.

If the solubility of the organic solvent with respect to water is less than or equal to 10%, or if the vapor pressure of the organic solvent is greater than that of water, it is preferable to remove the organic solvent, from the standpoint of stability of the colored particulate dispersion.

Removal of the organic solvent may be carried out at from 10° C. to 100° C. under a pressure from normal pressure to reduced pressure, and is preferably carried out at from 40 to 100° C. under normal pressure and from 10 to 50° C. under reduced pressure.

-Additives-

The colored particulate dispersion of the present invention may contain additives which are appropriately selected in accordance with purpose, provided that the additives are contained within a range so as not to impair the effects of the present invention.

Examples of additives include neutralizers, hydrophobic high-boiling point organic solvents, dispersing aids, dispersion stabilizers, and the like.

In a case in which the block copolymer has an unneutralized ionic group, a neutralizer can be used appropriately from the standpoints of adjusting the pH of the coloring particulate dispersion, adjusting a self-emulsification property, imparting dispersion stability, and the like.

Examples of neutralizers include organic bases, inorganic alkalis, and the like.

Examples of organic bases include triethanol amine, diethanol amine, N-methyldiethanol amine, dimethylethanol amine, and the like.

Examples of inorganic alkalis include hydroxides of alkali metals (e.g., sodium hydroxide, lithium hydroxide, or potassium hydroxide), carbonates (e.g., sodium carbonate or sodium bicarbonate), ammonia, and the like.

From the standpoint of improving the dispersion stability of the colored particulate dispersion, the neutralizer is preferably added such that the pH becomes 4.5 to 10.0, and is more preferably added such that the pH becomes 6.0 to 10.0.

The hydrophobic high-boiling point organic solvent is used for adjusting the viscosity, specific gravity, printing performance, and the like of the colored particulate dispersion. The hydrophobic high-boiling point organic solvent is hydrophobic and preferably has a boiling point of 150° C. or more, and more preferably 170° C. or more. Here, "hydrophobic" means a solubility of 3% or less with respect to distilled water at 25° C. Further, the dielectric constant of the hydrophobic high-boiling point organic solvent is preferably 3 to 12, and more preferably 4 to 10. Here, the dielectric constant means relative dielectric constant with respect to a vacuum at 25° C.

As the hydrophobic high-boiling point organic solvent, the compounds disclosed in U.S. Pat. No. 2,322,027 and Japanese Patent Application No. 2000-203857 can be used. Specific examples include triester phosphates, diester phthalates, alkyl naphthalenes, ester benzoates and the like. These compounds may be used as either liquid or solid at room temperature, in accordance with the purpose.

The used amount of the hydrophobic high-boiling point organic solvent is not particularly limited provided that it is within a range so as not to impair the effects of the present invention. However, an amount of 0 to 1,000 parts by mass, with respect to 100 parts by mass of the block copolymer, is preferable and an amount of 0 to 300 parts by mass is more preferable.

A dispersing aid and/or a dispersion stabilizer may be added to any of the block copolymer dispersion, the block copolymer solution, the dye solution, the liquid containing at least water, and the like. However, it is preferable to add the dispersing aid and/or dispersion stabilizer to the block copolymer, the dye solution, or the solution containing water, in a step before the preparation of the block copolymer and/or the dye particulate dispersion solution.

Examples of the dispersing aid and dispersion stabilizer are cationic, anionic, and non-ionic surfactants, water-soluble and water-dispersible low molecular weight compounds, oligomers, and the like. The added amount of the dispersing aid or dispersion stabilizer is preferably 0 to 100% by mass, with respect to the total mass of the oil-soluble dye and the block copolymer, and more preferably 0 to 20% by mass.

The colored particulate dispersion of the present invention may be used in any field, and is suited for water-based inks for writing, water-based printing inks, information recording inks, and the like. The colored particulate dispersion is especially suitably used in the ink for ink-jet recording of the present invention which will be described hereinafter.

(Ink for Ink-Jet Recording)

The ink for ink-jet recording of the present invention includes the colored particulate dispersion of the present invention, and may include other components which are appropriately selected as needed.

-Other Components-

Other components are contained within a range so as not to impair the effects of the present invention, and examples thereof are known additives such as drying-preventing agents, seepage-promoting agents, ultraviolet light absorbers, antioxidants, anti-fungal agents, pH-adjusting agents, surface tension-adjusting agents, antifoaming agents, viscosity-adjusting agents, dispersing aids, dispersion stabilizers, rustproofing agents, chelating agents, and the like.

A drying-preventing agent is suitably used in order to prevent clogging at the ink-jetting port of a nozzle used in an ink-jet recording system, which clogging is due to drying of the ink for ink-jet recording.

The drying-preventing agent is preferably a water-soluble organic solvent having a vapor pressure which is lower than that of water. Specific examples of the drying-preventing agent include polyvalent alcohols such as ethylene glycol, propylene glycol, diethylene glycol, polyethylene glycol, thiodiglycol, dithiodiglycol, 2-methyl-1,3-propaneglycol, 1,2,6-hexanetriol, acetylene glycol derivatives, glycerin, trimethyloyl propane, and the like; lower alkyl ethers of polyvalent alcohols such as ethylene glycol monomethyl (or ethyl) ether, diethyleneglycol monomethyl (or ethyl) ether, triethyleneglycol monoethyl (or butyl) ether, and the like; heterocycles such as 2-pyrrolidone, N-methyl-2-pyrrolidone, 1,3-dimethyl-2-imidazolidinone, N-ethylmorpholine, and the like; sulfur-containing compounds such as sulfolane, dimethyl sulfoxide, 3-sulfolene, and the like; multifunctional compounds such as diacetone alcohol, diethanol amine, and the like; and urea derivatives. Among these, polyvalent alcohols such as glycerin, diethylene glycol and the like are preferable.

A single drying-preventing agent may be used, or two or more drying-preventing agents may be used in combination. The drying-preventing agent is preferably contained in an amount of 10 to 50% by mass in the ink for ink-jet recording.

A seepage-promoting agent is suitably used for the purpose of making the ink for ink-jet recording seep into paper better.

Examples of the seepage-promoting agent include alcohols such as ethanol, isopropanol, butanol, di(tri)ethylene glycol monobutyl ether, 1,2-hexanediol, and the like, as well as nonionic surfactants such as sodium lauryl phosphate and sodium oleate.

The seepage-promoting agent is contained within a range that does not cause bleeding of the print, print-through, or the like. Sufficient effects are usually exhibited if the seepage-promoting agent is contained in the ink for ink-jet recording in an amount of about 5 to 30% by mass.

An ultraviolet light absorber is used for the purpose of improving preservability of the image. Examples of the ultraviolet light absorber are the benzotriazole compounds disclosed in JP-A Nos. 58-185677, 61-190537, 2-782, 5-197075, 9-34057, and the like; the benzophenone compounds disclosed in JP-A Nos. 46-2784, 5-194483, U.S. Pat. No. 3,214,463, and the like; the cinnamic acid compounds disclosed in JP-B Nos. 48-30492 and 56-21141 and JP-A No. 10-88106 and the like; the triazine compounds disclosed in JP-A Nos. 4-298503, 8-53427, 8-239368, and 10-182621, and Japanese Patent Application National Publication No. 8-501291 and the like; the compounds disclosed in Research Disclosure No. 24239; and compounds which absorb ultraviolet light and emit fluorescent light, i.e., so-called fluorescent whitening agents, which are exemplified by stilbene and benzoxazole compounds.

Antioxidants are used for the purpose of improving the preservability of the image. For example, any of various types of organic and metal complex fading-preventing agents can be used.

Examples of organic fading-preventing agents include hydroquinones, alkoxyphenols, dialkoxyphenols, phenols, anilines, amines, indans, chromans, alkoxyanilines, heterocycles, and the like.

Examples of metal complex fading-preventing agents include nickel complexes, zinc complexes and the like. Specifically, compounds of the patents cited in Research Disclosure No. 17643 (pages I through J of section VII), Research Disclosure No. 15162, Research Disclosure No. 18716 (the left column of page 650), Research Disclosure No. 36544 (page 527), Research Disclosure No. 307105 (page 872), and Research Disclosure No. 15162, as well as compounds included in the compound examples and the general formulas of representative compounds disclosed on pages 127 through 137 of JP-A No. 62-215272, may be used.

Examples of an anti-fungal agent are sodium dehydroacetate, sodium benzoate, sodium pyridinethion-1-oxide, ethyl ester p-hydroxybenzoate, 1,2-benzoisothiazoline-3-on, salts thereof, and the like. The anti-fungal agent is preferably used in an amount of 0.02 to 1.00% by mass of the ink.

The above-listed neutralizers (organic bases, inorganic alkalis) can be used as a pH-adjusting agent. The pH-adjusting agent is preferably, for the purpose of improving the storage stability of the ink for ink-jet recording, added such that the pH of the ink for ink-jet recording becomes 6 to 10, and more preferably becomes 7 to 10.

Suitable examples of a surface tension-adjusting agent include nonionic, cationic, and anionic surfactants.

The surface tension of the ink for ink-jet recording of the present invention is preferably 25 to 70 mN/m, and is more preferably 25 to 60 mN/m.

Further, the viscosity of the ink for ink-jet recording of the present invention is preferably less than or equal to 30 mPa·s, and more preferably less than or equal to 20 mPa·s.

Chelating agents such as fluorine or silicone compounds and EDTA may be used as needed as an antifoaming agent.

(Ink-jet Recording Method)

In the ink-jet recording method of the present invention, recording is carried out onto an image-receiving material by using the above-described ink for ink-jet recording. The ink nozzles and the like used at this time are not particularly limited, and can be selected appropriately in accordance with the purpose.

-Image-Receiving Material-

The image-receiving material is not particularly limited. Examples thereof are known materials onto which recording is effected, such as regular paper, resin-coated paper, dedicated ink-jet paper, film, paper which can also be used for electrophotography, cloth, glass, metal, ceramics, and the like.

Among these materials onto which recording is effected, dedicated ink-jet paper is preferable, and the papers disclosed in the following publications, for example, are even more preferable: JP-A Nos. 8-169172, 8-27693, 2-276670, 7-276789, 9-323475, 62-238783, 10-153989, 10-217473, 10-235995, 10-337947, 10-217597, 10-337947, and the like.

In the present invention, among the aforementioned image-receiving materials, the following recording papers and recording films are particularly preferable.

The recording paper and the recording film are formed by layering a support and an image-receiving layer, and, as necessary, other layers such as a backcoat layer and the like.

For each of the layers, including the image-receiving layer, a single layer may be provided, or two or more layers may be provided.

The support is formed from chemical pulp such as LBKP or NBKP, mechanical pulp such as GP, PGW, RMP, TMP, CTMP, CMP, or CGP, used paper pulp such as DIP, or the like. Where needed, conventional, known pigments, binders, sizing agents, fixing agents, cation agents, paper strength increasing agents, and the like may be mixed therein. Supports which have been manufactured by any of various devices such as a fourdrinier machine, a cylinder machine, or the like can be used. Further, besides these supports, synthetic paper, a plastic film sheet, or the like may be used.

The thickness of the support is about 10 to 250 μm, and the basic weight thereof is 10 to 250 g/m$^2$.

The image-receiving layer may be provided at the support, and the backcoat layer may further be provided at the support. Further, the image-receiving layer and the backcoat layer may be provided after size pressing is carried out with starch, polyvinyl alcohol, or the like, or after an undercoat layer is provided.

Further, the support may be subjected to flattening pressing by a calendering device such as a machine calender, a TG calender, a soft calender, or the like.

Among the aforementioned supports, a plastic film, and a paper whose both surfaces are laminated with polyolefin (e.g., polyethylene, polystyrene, polyethylene terephthalate, polybutene, a copolymer thereof, or the like) are preferably used.

It is more preferable to add to the polyolefin a white pigment (e.g., titanium oxide, zinc oxide, or the like) or a coloring dye (e.g., cobalt blue, ultramarine, neodymium oxide, or the like)

The image-receiving layer includes a pigment, a water-based binder, a mordant, a waterproofing agent, a light resistance-improving agent, a surfactant, and other additives.

The pigment is preferably a white pigment. Suitable examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, zinc carbonate, and the like, and organic pigments such as styrene pigments, acrylic pigments, urea resin, melamine resin, and the like.

Among these white pigments, porous inorganic pigments are preferable, and synthetic amorphous silica or the like having a large pore surface area is more preferable.

Silicic anhydride obtained by a dry manufacturing method or hydrated silicic acid obtained by a wet manufacturing method can be used as the synthetic amorphous silica. However, hydrated silicic acid is particularly preferable.

Examples of the water-based binder are water-soluble polymers such as polyvinyl alcohol, silanol-denatured polyvinyl alcohol, starch, cationized starch, casein, gelatin, carboxymethyl cellulose, hydroxyethyl cellulose, polyvinyl pyrrolidone, polyalkylene oxide, polyalkylene oxide derivatives, and the like; and water dispersible polymers such as styrene-butadiene latex, acryl emulsion, and the like.

A single one of these water-based binders may be used, or two or more water-based binders may be used in combination. Among the binders, polyvinyl alcohol and silanol-denatured polyvinyl alcohol are preferable from the standpoints of adhesion to the pigment and peeling resistance of the image-receiving layer.

It is preferable that the mordant is immobile. Therefore, a polymer mordant is preferably used.

Examples of polymer mordants are the polymer mordants disclosed in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236, U.S. Pat. Nos. 2,484,430, 2,548,564, 3,148,061, 3,309,690, 4,115,124, 4,124,386, 4,193,800, 4,273,853, 4,282,305, and 4,450,224. The polymer mordants disclosed on pages 212 through 215 of JP-A No. 1-161236 are particularly preferable. If a polymer mordant disclosed in JP-A No. 1-161236 is used, an image with excellent image quality is obtained, and the light resistance of the image is improved.

The waterproofing agent is effective in waterproofing the image. A suitable example of the waterproofing agent is a cationic resin.

Examples of cationic resins are polyamide polyamine epichlorohydrine, polyethylene imine, polyamine sulfone, dimethyldiaryl ammonium chloride polymer, cationic polyacrylamide, colloidal silica, and the like. Among these, polyamide polyamine epichlorohydrine is particularly preferable.

The contained amount of the cationic resin is preferably 1 to 15% by mass and more preferably 3 to 10% by mass with respect to the total solid content of the image-receiving layer.

Examples of the light resistance-improving agent are zinc sulfate, zinc oxide, hindered amine antioxidants, and benzotriazole ultraviolet light absorbers such as benzophenone and the like. Among these, zinc sulfate is particularly preferable.

The surfactant functions as a coating aid, a peelability improving agent, a slidability improving agent, or an antistatic agent. Examples of surfactants are those disclosed in JP-A Nos. 62-173463 and 62-183457.

An organic fluoro compound may be used in place of the surfactant. The organic fluoro compound is preferably hydrophobic. Examples of the organic fluoro compound are fluorine surfactants, oily fluorine compounds (e.g., fluorine oil), and solid fluorine compound resins (e.g., tetrafluoroethylene resin).

Examples of the organic fluoro compound are disclosed in JP-B No. 57-9053 (columns 8 through 17), and JP-A Nos. 61-20994 and 62-135826.

Examples of other additives are pigment-dispersing agents, thickening agents, antifoaming agents, dyes, fluorescent whitening agents, preservatives, pH-adjusting agents, matte agents, film-hardening agents, and the like.

The backcoat layer contains a white pigment, a water-based binder, and other components.

Examples of the white pigment are white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrated halloysite, magnesium carbonate, magnesium hydroxide, and the like; and organic pigments such as styrene-based plastic pigments, acryl-based plastic pigments, polyethylene, microcapsules, urea resins, melamine resins, and the like; and the like.

Examples of the water-based binder are water-soluble polymers such as a styrene/maleate copolymer, a styrene/acrylate copolymer, polyvinyl alcohol, silanol-denatured polyvinyl alcohol, starch, cationized starch, casein, gelatin, carboxymethyl cellulose, hydroxyethyl cellulose, polyvinyl pyrrolidone, and the like; water-dispersible polymers such as a styrene-butadiene latex, acrylic emulsion, and the like; and the like.

Examples of other components are antifoaming agents, foaming-suppressing agents, dyes, fluorescent whitening agents, preservatives, waterproofing agents, and the like.

The polymer latex may be added to the structural layers (including the backcoat layer) of the recording paper and recording film.

A polymer latex is used for the purposes of dimensional stability, preventing curling, preventing adhesion, and improving film properties, such as preventing cracking of the film.

Description of polymer latexes is given in JP-A Nos. 62-245258, 62-1316648, and 62-110066.

When a polymer latex having a low glass transition temperature (of 40° C. or less) is added to a layer including a mordant, cracking and curling of the layer can be prevented. Further, when a polymer latex having a high glass transition temperature is added to the backcoat layer, curling can be prevented.

The ink-jet recording method of the present invention is not particularly limited, and may be any of known methods such as: a charge control method in which ink is expelled by using electrostatic induction force; a drop-on-demand method (pressure pulse method) using vibration pressure of a piezo element; an acoustic ink-jet method in which ink is expelled by varying an electric signal by an acoustic beam, irradiating the ink, and utilizing radiation pressure; a thermal ink-jet (bubble jet) method in which ink is heated, a bubble is formed, and the generated pressure is utilized; and the like.

The ink-jet recording method encompasses a method of ejecting, in large number and small volumes, an ink having a low density which is known as a photo ink, a method of improving image quality by using plural inks having substantially the same phase and different densities, and a method of using a colorless transparent ink.

EXAMPLES

Examples of the present invention will be described hereinafter. However, the present invention is not limited to these Examples. Note that, hereinafter, "parts" and "%" refer to "parts by mass" and "% by mass" unless otherwise indicated.

Example 1

Preparation Example 1 (Preparation of Colored Particulate Dispersion (B-1))

To a mixed solution of 4 parts of isopropyl alcohol, 6 parts of tert-butanol, 1.2 parts of block copolymer (P-13), and 0.8 parts of oil-soluble dye (M-1), 2-mol/l sodium hydroxide was added gradually in an amount such that 70% of acid of the block copolymer was neutralized. Thereafter, the solution was heated to 80° C. Thereafter, 30 parts of water was added while stirring was carried out. This liquid was condensed at 40° C. under reduced pressure, and a colored particulate dispersion having a solid content of 11.3% was prepared. The particle diameter of the colored particulates within the colored particulate dispersion was a volume average diameter of 73 nm (as measured by MICROTRACK UPA 150, manufactured by Nikkiso Co., Ltd.). Hereinafter, this colored particulate dispersion will be referred to as colored particulate dispersion (B-1).

Preparation Example 2 (Preparation of Colored Particulate Dispersion (B-2))

A mixed solution containing 3 parts of ethyl acetate, 0.5 parts of cyclohexanone, 1.2 parts of block copolymer (P-14), and 0.8 parts of oil-soluble dye (M-6) was prepared. Further, a mixed solution containing 2-mol/l sodium hydroxide in an amount such that 70% of the acid of the block copolymer would be neutralized, 15 parts of water, and 0.2 parts of sodium di(2-ethylhexyl) sulfosuccinic acid was prepared.

The two mixed solutions were combined, and were mixed together and emulsified in a homogenizer. Thereafter, the mixture was concentrated at 40° C. under reduced pressure, and a colored particulate dispersion having a solid content of 11.3% was prepared. The particle diameter of the colored particulates within the colored particulate dispersion was a volume average diameter of 65 nm. Hereinafter, this colored particulate dispersion will be referred to as colored particulate dispersion (B-2).

Preparation Example 3 (Preparation of Colored Particulate Dispersion (B-3))

A mixed solution of 5 parts of tetrahydrofuran, 5 parts of tert-butanol, 1.2 parts of block copolymer (P-8), and 0.8 parts of oil-soluble dye (M-11) was heated to 80° C. Thereafter, 30 parts of water was added while stirring was carried out. This solution was concentrated at 40° C. under reduced pressure, and a colored particulate dispersion having a solid content of 11.3% was prepared. The particle diameter of the colored particulates within the colored particulate dispersion was a volume average diameter of 52 nm. Hereinafter, this colored particulate dispersion will be referred to as colored particulate dispersion (B-3).

Preparation Examples 4 through 9

By a method similar to that of Preparation Example 1, B-4 through B-7 were prepared. By a method similar to that of Preparation Example 2, B-8 was prepared. By a method similar to that of Preparation Example 3, B-9 was prepared. The block copolymers and oil-soluble dyes which were used are listed in following Table 4.

Comparative Preparation Examples 1 and 2

By a method similar to that of Preparation Example 1, PB-1 and PB-2 were prepared. The block copolymers and oil-soluble dyes which were used are listed in following Table 4.

The polymers which were used are the following, and are radical copolymers of a hydrophilic monomer and a hydrophobic monomer. The values in parentheses show mole ratios. PH-1: n-butylmethacrylate/methacrylic acid (2/1) copolymer PH-2: n-hexylmethacrylate/acrylic acid (6/5) copolymer

TABLE 4

| Preparation Example | Dispersion No. | Block Copolymer No. | Contained Amount of Acid mmol/g | Molecular Weight Mw | Oil-Soluble Dye | Particle Diameter nm |
|---|---|---|---|---|---|---|
| 1 | B-1 | P-13 | 3.29 | 6100 | M-1 | 73 |
| 2 | B-2 | P-14 | 2.66 | 7500 | M-6 | 65 |
| 3 | B-3 | P-8 | 2.63 | 3800 | M-11 | 52 |
| 4 | B-4 | P-28 | 3.83 | 6500 | C-1 | 68 |
| 5 | B-5 | P-22 | 1.68 | 5900 | C-3 | 89 |
| 6 | B-6 | P-16 | 2.68 | 14900 | C-7 | 74 |
| 7 | B-7 | P-13 | 3.29 | 6100 | M-4 | 63 |
| 8 | B-8 | P-13 | 3.29 | 6100 | M-10 | 75 |
| 9 | B-9 | P-13 | 3.29 | 6100 | M-12 | 76 |
| Comparative Preparation Example 1 | PB-1 | PH-1 | 2.70 | 9300 | M-11 | unsatisfactory dispersion |
| Comparative Preparation Example 2 | PB-2 | PH-2 | 3.89 | 6700 | C-1 | 120 |

As can be seen from the results of Table 4, when the block copolymers of the present invention were used, colored particulate dispersions, in which there was no aggregation and which had small particle diameters, could be prepared.

Example 2

<Preparation of Ink 01>

10 parts of diethylene glycol, 5 parts of glycerin, 0.5 parts of sodium hexaethylene glycol monododecylether sulfate, 0.5 parts of sodium di (2-ethylhexyl) sulfosuccinic acid, and 36 parts of ion exchange water were mixed together with 42 parts of the colored particulate dispersion (B-1) prepared in Preparation Example 1 of Example 1. The mixture was filtered through a 0.45 μm filter, and a water-based ink 01 for ink-jet recording was prepared.

<Preparation of Inks 02 through 09>

Water-based inks 02 through 09 were prepared in the same way as ink 01 was prepared, except that the colored particulate dispersion (B-1) in the above-described preparation of ink 01 was replaced with the colored particulate dispersions (B-2) through (B-9) prepared in Preparation Examples 2 through 9 of Example 1.

<Preparation of Ink 10>

6.4 parts of the oil-soluble dye (D-4), 8.0 parts of sodium dioctylsulfosuccinic acid, and 19.0 parts of block copolymer (P-13) were dissolved at 70° C. in 7.7 parts of hydrophobic high-boiling point organic solvent (S-1) and 50 parts of ethyl acetate. During the dissolving, 2-mol/l sodium hydroxide was gradually added in an amount such that 70% of the acid of the block copolymer was neutralized. 500 parts of deionized water was added to this solution while stirring was carried out with a magnetic stirrer, such that an oildrop-in-water type rough particulate dispersion was prepared. Next, this rough particulate dispersion was passed five times through a microfluidizer (manufactured by Microfluidex Inc.) at a pressure of 600 bar, so as to change the particles into particulates. Then, the obtained emulsion was desolvated in a rotary evaporator until an ethyl acetate odor disappeared. To this obtained fine emulsion were added 140 parts of diethylene glycol, 50 parts of glycerin, 7 parts of SURFYNOL 465 (manufactured by Air Products and Chemicals, Co.), and 900 parts of deionized water, so as to prepare ink 10 for ink-jet recording.

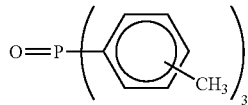

S-1

<Preparation of Ink 11>

An ink 11 for ink-jet recording was prepared in the same way as ink 01 was prepared, except that the colored particulate dispersion (B-1) in the preparation of ink 01 was replaced with the colored particulate dispersion (PB-2) prepared in Comparative Preparation Example 2 of Example 1.

(Image Recording and Evaluation)

The prepared inks 01 through 11 were filled into ink-jet printer PM-670C cartridges (manufactured by Epson Co., Ltd.) and, using the same machine, images were recorded onto ink-jet paper photo glossy paper EX (manufactured by Fuji Photo Film Co., Ltd.), and evaluation was carried out as follows. Results of evaluation are given in following Table 5.

<Evaluation of Printing Performance ①>

The cartridge was set in the printer and, after ink discharge from all nozzles had been confirmed, images were printed onto twenty A4-size papers. Disturbance of the printed images was evaluated in accordance with the following criteria.

A: No disturbance of the printed image from the start to the end of printing.

B: Disturbance of the printed image occurred at some times from the start to the end of printing.

C: Disturbance of the printed image from the start to the end of printing.

<Evaluation of Printing Performance ②>

The cartridge was left to stand for 3 days at 50° C. Thereafter, the disturbance of the printed image was evaluated in accordance with the same criteria in the same way as the printing performance ①.

<Evaluation of Dependence on Paper>

The color tone of the image formed on the aforementioned photo glossy paper and the color tone of an image which was formed separately on regular paper for PPC were compared. One of two marks was given. If the difference between the images was slight, a mark of ○ (good) was given. If the difference between the images was great, a mark of × (poor) was given.

<Evaluation of Water Resistance>

The photo glossy paper on which the image was formed was dried for one hour at room temperature, thereafter, was immersed in water for 30 seconds, was left to dry naturally at room temperature, and bleeding thereof was observed. One of three marks was given. Images in which there was no bleeding received a mark of A, images in which there was a slight amount of bleeding received a mark of B, and images in which there was much bleeding received a mark of C.

<Evaluation of Light Resistance>

By using a weathermeter (ATLAS C.I65), the photo glossy paper on which the image was formed was irradiated for three days with xenon light (85,000 1×). Image densities before and after the irradiation with xenon light were measured by using a reflection densitometer (X-RITE 310TR), and a dye remaining rate was evaluated. The reflection density was measured at three points, 1, 1.5 and 2.0. One of three marks was given. If the dye remaining rate at all of the densities was 80% or more, a mark of A was given, if the dye remaining rate was less than 80% at one or two points, a mark of B was given, and if the dye remaining rate at all of the densities was less than 80%, a mark of C was given.

<Evaluation of Dark Heat Fastness>

After the image was printed, the reflection density was measured by using the X-RITE 310TR before and after storage for 7 days under conditions of 80 to 70% RH. The dye remaining rate was evaluated. The reflection density was measured at three points, 1, 1.5 and 2.0. One of three marks was given. If the dye remaining rate at all of the densities was 80% or more, a mark of A was given, if the dye remaining rate was less than 80% at one or two points, a mark of B was given, and if the dye remaining rate at all of the densities was less than 80%, a mark of C was given.

TABLE 5

| Ink No. | Coloring Particulate Dispersion No. | Printing Performance ① | Printing Performance ② | Dependence on Paper | Water Resistance | Light Resistance | Dark Heat Fastness | Notes |
|---|---|---|---|---|---|---|---|---|
| 01 | B-1 | A | A | ○ | A | A | A | (present invention) |
| 02 | B-2 | A | A | ○ | A | A | A | (present invention) |
| 03 | B-3 | A | A | ○ | A | A | A | (present invention) |
| 04 | B-4 | A | A | ○ | A | A | A | (present invention) |
| 05 | B-5 | A | A | ○ | A | A | A | (present invention) |
| 06 | B-6 | A | A | ○ | A | A | A | (present invention) |
| 07 | B-7 | A | A | ○ | A | A | A | (present invention) |
| 08 | B-8 | A | A | ○ | A | A | A | (present invention) |
| 09 | B-9 | A | A | ○ | A | A | A | (present invention) |
| 10 | — | A | A | ○ | A | A | A | (present invention) |
| 11 | PB-2 | B | C | ○ | A | A | A | (comparative example) |

As is clear from the results of Table 5, the inks for ink-jet recording of the Examples had small particle diameters, excellent suitability for printing, excellent color-forming ability and color tone, were not dependent on paper, and had excellent water resistance, light resistance and dark heat fastness.

Example 3

<Preparation of Ink Set 101>

5 parts of magenta dye (M-6) and 1.25 parts of block copolymer (P-13) were dissolved at 70° C. in 3.63 parts of hydrophobic high-boiling point organic solvent (S-1), 6.38 parts of hydrophobic high-boiling point organic solvent (S-2), 3.13 parts of sodium dioctyl sulfosuccinic acid, and 50 ml of ethyl acetate. To this solution was added 500 ml of deionized water while stirring was carried out with a magnetic stirrer, such that an oildrop-in-water type rough particle dispersion was prepared. To this mixed solution, 2-mol/l sodium hydroxide was added until 70% of the acid of the block copolymer was neutralized.

Then, this rough particulate dispersion was passed five times through a microfluidizer (manufactured by Microfluidex Inc.) at a pressure of 600 bar, so as to change the particles into particulates. Then, the obtained emulsion was desolvated in a rotary evaporator until ethyl acetate odor disappeared, and a colored particulate dispersion (for light magenta ink) was obtained.

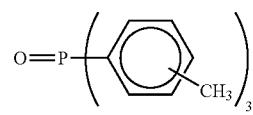
S-1

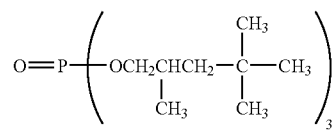
S-2

The oil-soluble dye and the amount of the hydrophobic high-boiling point organic solvent, and the amount of SUR-FYNOL 465 in the preparation of the colored particulate dispersion for light magenta ink were varied as per following Table 6, so as to prepare an ink set 101 of six types of ink which were, in addition to the light magenta ink, a magenta ink, a light cyan ink, a cyan ink, a yellow ink and a black ink.

The structural formula of the dye (YY-1) used for the yellow ink and the black ink is shown below.

TABLE 6

|  | light magenta ink | magenta ink | light cyan ink | cyan ink | yellow ink | black ink |
|---|---|---|---|---|---|---|
| dye | M-6 5.00 g | M-6 20.0 g | C-1 9.3 g | C-1 37.2 g | YY-1 27.2 g | M-6 10.0 g<br>C-1 18.6 g<br>YY-1 13.6 g |

TABLE 6-continued

| | light magenta ink | magenta ink | light cyan ink | cyan ink | yellow ink | black ink |
|---|---|---|---|---|---|---|
| high boiling point organic solvent | S-1 3.63 g S-2 6.38 g | S-1 14.52 g S-2 25.52 g | S-1 6.75 g S-2 11.9 g | S-1 27.0 g S-2 47.6 g | S-1 19.74 g S-2 34.7 g | S-1 30.6 g S-2 53.8 g |
| block copolymer | P-13 1.25 g | P-13 5.0 g | P-13 2.33 g | P-13 9.3 g | P-13 6.8 g | P-13 10.6 g |
| sodium dioctyl sulfosuccinic acid | 3.13 g | 12.5 g | 11.6 g | 46.4 g | 34.0 g | 52.7 g |
| diethylene glycol | 110.0 g | 110.0 g | 110.0 g | 110.0 g | 110.0 g | 110.0 g |
| urea | 46.0 g | 46.0 g | 46.0 g | 46.0 g | 46.0 g | 46.0 g |
| glycerin | 50.0 g | 50.0 g | 50.0 g | 50.0 g | 50.0 g | 50.0 g |
| SURFYNOL 465 | 5.5 g | 5.5 g | 5.5 g | 5.5 g | 5.5 g | 5.5 g |
| triethanol amine | 7.5 g | 7.5 g | 7.5 g | 7.5 g | 7.5 g | 7.5 g |
| benzotriazole | 0.075 g | 0.075 g | 0.075 g | 0.075 g | 0.075 g | 0.075 g |
| preservative PROXEL XL2 | 2.5 g | 2.5 g | 2.5 g | 2.5 g | 2.5 g | 2.5 g |
| volume average particle diameter | 30 nm | 37 nm | 42 nm | 39 nm | 39 nm | 46 nm |

YY-1

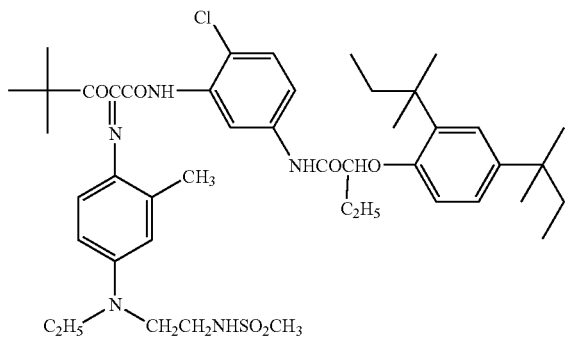

<Preparation of Ink Sets 102 through 107>

The oil-soluble dye and the block copolymer in the preparation of the ink set 101 were replaced as shown in following Tables 7 and 8, so as to prepare ink sets 102 through 106. Further, an ink set 107 in accordance with following Table 9 was prepared as an ink set using water-soluble dyes for comparison.

The structural formulas of the dyes (YY-2, MM-2, MM-3, CC-2, CC-3, and A-1 through A-7) used in the ink sets 102 through 107 are shown below.

TABLE 7

| ink set | | light magenta ink | magenta ink | light cyan ink | cyan ink | yellow ink | black ink | notes |
|---|---|---|---|---|---|---|---|---|
| 101 | dye | M-6 5.00 g | M-6 20.0 g | C-1 9.3 g | C-1 37.2 g | YY-1 27.2 g | M-6 10.0 g C-1 18.6 g YY-1 13.6 g | Example |
| | high boiling point organic solvent S-1/S-2 | 3.63 g/6.38 g | 14.52 g/25.52 g | 6.75 g/11.9 g | 27.0 g/47.6 g | 19.7 g/34.7 g | 30.6 g/53.8 g | |
| | block copolymer volume average particle diameter | P-16 1.25 g 33 nm | P-16 5.0 g 43 nm | P-16 2.33 g 32 nm | P-16 9.3 g 36 nm | P-16 6.8 g 30 nm | P-16 10.6 g 42 nm | |
| 102 | dye | M-6 5.00 g | M-6 20.0 g | C-1 9.3 g | C-1 37.2 g | YY-1 27.2 g | M-6 10.0 g C-1 18.6 g YY-1 13.6 g | Example |
| | high boiling point organic solvent S-1/S-2 | 3.63 g/6.38 g | 14.52 g/25.52 g | 6.75 g/11.9 g | 27.0 g/47.6 g | 19.7 g/34.7 g | 30.6 g/53.8 g | |
| | block copolymer volume average particle diameter | P-14 1.25 g 42 nm | P-14 5.0 g 51 nm | P-14 2.23 g 43 nm | P-14 9.3 g 53 nm | P-14 6.8 g 60 nm | P-14 10.6 g 79 nm | |

TABLE 7-continued

| ink set | | light magenta ink | magenta ink | light cyan ink | cyan ink | yellow ink | black ink | notes |
|---|---|---|---|---|---|---|---|---|
| 103 | dye | M-6 5.00 g | M-6 20.0 g | C-1 9.3 g | C-1 37.2 g | YY-1 27.2 g | M-6 10.0 g<br>C-1 18.6 g<br>YY-1 13.6 g | Example |
| | high boiling point organic solvent S-1/S-2 | 0.81 g/1.42 g | 3.26 g/5.73 g | 1.51 g/2.66 g | 6.06 g/10.7 g | 4.42 g/7.77 g | 6.87 g/12.1g | |
| | block copolymer volume average particle diameter | P-8 10.0 g<br>38 nm | P-8 40.0 g<br>39 nm | P-8 18.6 g<br>37 nm | P-8 74.6 g<br>37 nm | P-8 54.6 g<br>36 nm | P-8 84.4 g<br>45 nm | |

TABLE 8

| ink set | | light magenta ink | magenta ink | light cyan ink | cyan ink | yellow ink | black ink | notes |
|---|---|---|---|---|---|---|---|---|
| 104 | dye | MM-2 3.6 g | MM-2 14.4 g | CC-2 17.4 g | MM-2 69.9 g | YY-2 26.5 g | MM-2 6.5 g<br>CC-2 34.8 g<br>YY-2 13.3 g | Example |
| | high boiling point organic solvent S-1/S-2 | 2.6 g/4.6 g | 10.5 g/18.5 g | 12.6 g/22.1 g | 50.5 g/88.7 g | 19.2 g/33.7 g | 39.6 g/69.6 g | |
| | block copolymer volume average particle diameter | P-1 0.72 g<br>P-20 0.72 g<br>33 nm | P-1 2.88 g<br>P-20 2.88 g<br>30 nm | P-1 3.48 g<br>P-20 3.48 g<br>31 nm | P-1 13.9 g<br>P-20 13.9 g<br>43 nm | P-1 5.3 g<br>P-20 5.3 g<br>41 nm | P-1 10.9 g<br>P-20 10.9 g<br>52 nm | |
| 105 | dye | MM-3 3.6 g | MM-3 14.4 g | CC-3 17.4 g | CC-3 69.6 g | YY-2 26.5 g | MM-3 6.5 g<br>CC-3 34.8 g<br>YY-2 13.3 g | Comparative Example |
| | high boiling point organic solvent S-1/S-2 | 2.6 g/4.6 g | 10.5 g/18.5 g | 12.6 g/22.1 g | 50.5 g/88.7 g | 19.2/33.7 g | 39.6 g/69.6 g | |
| | block copolymer volume average particle diameter | P-22 0.9 g<br>40 nm | P-22 3.6 g<br>38 nm | P-22 4.35 g<br>38 nm | P-22 17.4 g<br>49 nm | P-22 6.6 g<br>53 nm | P-22 13.7 g<br>57 nm | |
| 106 | dye | M-6 5.00 g | M-6 20.0 g | C-1 9.3 g | C-1 37.2 g | YY-1 27.2 g | M-6 10.0 g<br>C-1 18.6 g<br>YY-1 13.6 g | Comparative Example |
| | high boiling point organic solvent s-1/S-2 | 3.63 g/6.38 g | 14.52 g/25.52 g | 6.75 g/11.9 g | 27.0 g/47.6 g | 19.7 g/34.7 g | 30.6 g/53.8 g | |
| | block copolymer volume average particle diameter | PH-2 1.25 g<br>50 nm | PH-2 5.0 g<br>52 nm | PH-2 2.33 g<br>33 nm | PH-2 9.3 g<br>42 nm | PH-2 6.8 g<br>45 nm | PH-2 10.6 g<br>49 nm | |

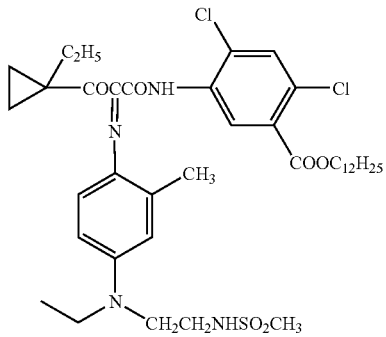

YY-2

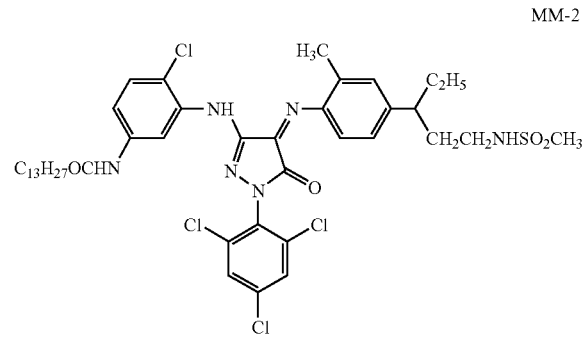

MM-2

-continued

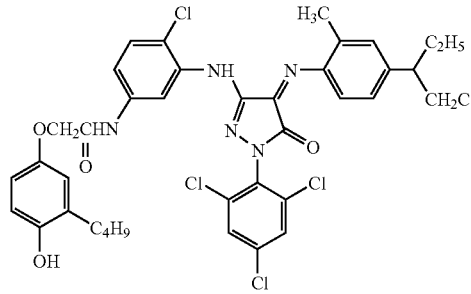

MM-3

CC-2

CC-3

TABLE 9

| | light magenta ink | magenta ink | light cyan ink | cyan ink | yellow ink | black ink |
|---|---|---|---|---|---|---|
| dye | A-1 7.0 g | A-1 28.0 g | A-2 8.75 g | A-2 35.0 g | A-3 14.7 g A-4 14.0 g | A-5 20.0 g A-6 20.0 g A-7 20.0 g A-8 21.0 g |
| diethylene glycol | 150.0 g | 110.0 g | 130.0 g | 200.0 g | 160.0 g | 20.0 g |
| urea | 37.0 g | 46.0 g | — | — | — | — |
| glycerin | 130.0 g | 130.0 g | 150.0 g | 180.0 g | 150.0 g | 120.0 g |
| triethylene glycol monobutyl ether | 130.0 g | 140.0 g | 130.0 g | 140.0 g | 130.0 g | — |
| diethylene glycol monobutyl ether | — | — | — | — | — | 230.0 g |
| 2-pyrolidone | — | — | — | — | — | 80.0 g |
| SURFYNOL 465 | 10.5 g | 11.5 g | 11.1 g | 9.8 g | — | — |
| SURFYNOL TG | — | — | — | — | 9.0 g | 8.5 g |
| triethanol amine | 6.9 g | 7.4 g | 6.8 g | 6.7 g | 0.8 g | 17.9 g |
| benzotriazole | 0.08 g | 0.07 g | 0.08 g | 0.08 g | 0.06 g | 0.06 g |
| preservative PROXEL XL2 | 3.5 g | 2.5 g | 1.8 g | 2.0 g | 2.5 g | 1.8 g |

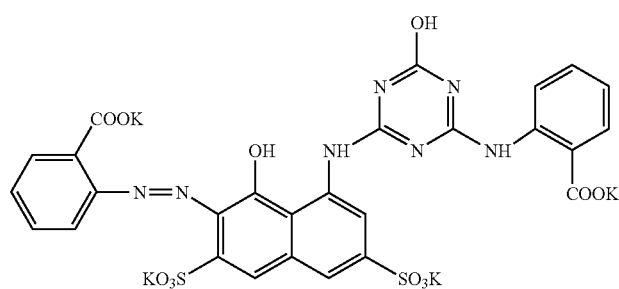

A-1

-continued

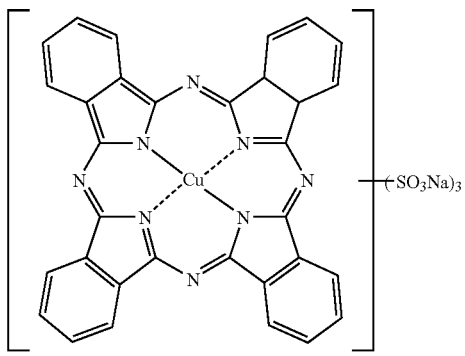
A-2

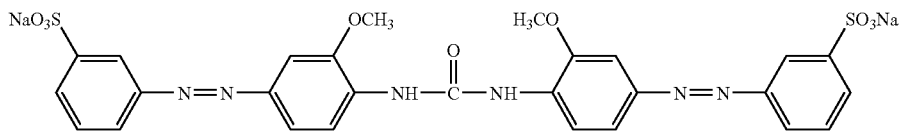
A-3

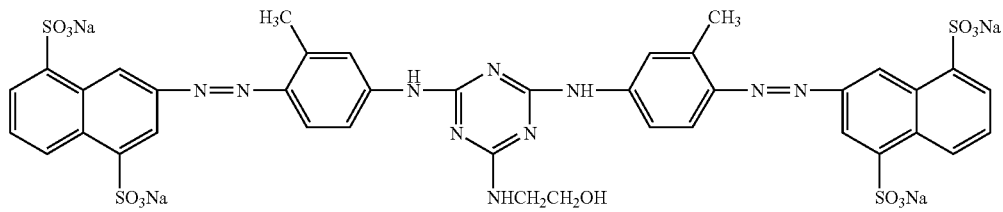
A-4

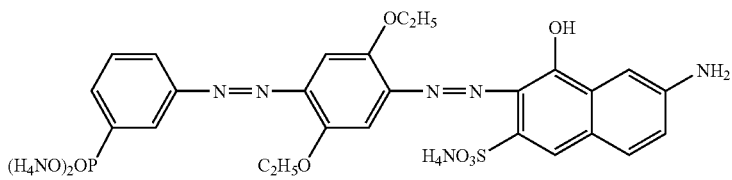
A-5

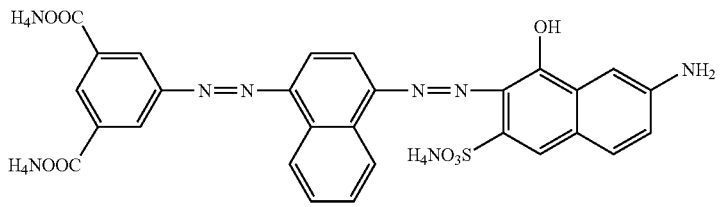
A-6

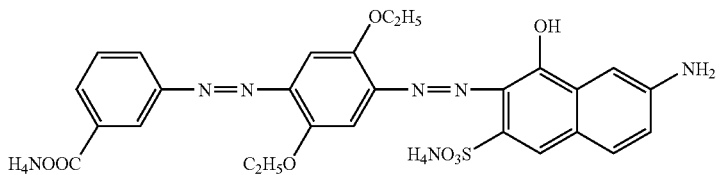
A-7

(Image Recording and Evaluation)

After images were recorded with the prepared ink sets 101 through 107 in the same way as in Example 2, the following evaluations were carried out. The results of evaluation are given in following Tables 10 and 11.

<Evaluation of Printing Performance ①>

Evaluation was carried out in the same manner as in Example 2 in accordance with the same criteria.

<Evaluation of Printing Performance ②>

Evaluation was carried out in the same manner as in Example 2 in accordance with the same criteria.

<Evaluation of Dryability>

Immediately after the image was printed, the image portions were touched by a finger, and an amount of smudging was evaluated visually. A mark of ○ means that no smudging occurred.

<Evaluation of Bleeding of Thin Lines>

Yellow, magenta, cyan and black fine line patterns were printed and were evaluated visually. A mark of ○ means that no bleeding was detected, whereas a mark of Δ means that a slight amount of bleeding was confirmed.

<Evaluation of Water Resistance>

Evaluation was carried out in the same manner as in Example 2 in accordance with the same criteria.

<Evaluation of Erasability>

After 30 minutes had elapsed after the image was printed, the image was rubbed with an eraser, and the presence/absence of changes in density of the image portion was evaluated visually. A score of "A" means good results in which hardly any changes in density were detected, and a mark of "B" means poor results in which changes in density were confirmed.

<Evaluation of Dependence on Paper>

Evaluation was carried out in the same manner as in Example 2 in accordance with the same criteria.

<Evaluation of Light Resistance>

Evaluation was carried out in the same manner as in Example 2 in accordance with the same criteria.

<Evaluation of Dark Heat Fastness>

Evaluation was carried out in the same manner as in Example 2 in accordance with the same criteria.

TABLE 10

| Ink Set No. | Printing Performance ① | Printing Performance ② | Dryability | Bleeding of Thin Lines | Water Resistance | Resistance to Erasing | Dependence on Paper | Notes |
|---|---|---|---|---|---|---|---|---|
| 101 | A | A | ○ | ○ | A | A | ○ | (present invention) |
| 102 | A | A | ○ | ○ | A | A | ○ | (present invention) |
| 103 | A | A | ○ | ○ | A | A | ○ | (present invention) |
| 101 | A | A | ○ | ○ | A | A | ○ | (present invention) |
| 105 | A | A | ○ | ○ | A | A | ○ | (present invention) |
| 106 | A | C | ○ | ○ | A | A | ○ | (comparative example) |
| 107 | A | A | ○ | Δ | C | A | X | (comparative example) |

TABLE 11

| ink set no. | light resistance | | | | dark heat fastness resistance | | | | notes |
|---|---|---|---|---|---|---|---|---|---|
| | Y | M | C | BK | Y | M | C | BK | |
| 101 | A | A | A | A | A | A | A | A | (present invention) |
| 102 | A | A | A | A | A | A | A | A | (present invention) |
| 103 | A | A | A | A | A | A | A | A | (present invention) |
| 104 | A | A | A | A | A | A | A | A | (present invention) |
| 105 | A | A | A | A | A | A | A | A | (present invention) |
| 106 | A | A | A | A | A | A | A | A | (comparative example) |
| 107 | A | C | A | B | A | B | A | A | (comparative example) |

As is clear from the results of Tables 10 and 11, the inks of the Examples had small particle diameter, excellent suitability for printing, no bleeding, excellent color formation and color tone, no dependence on paper, good water resistance and light resistance, and excellent dryability, dark heat fastness and resistance to erasing.

In accordance with the present invention, there is provided a colored particulate dispersion in which the particle diameter of the colored particulates is small, the dispersion stability is excellent, there is little dependency on paper, excellent color formation and color tone are obtained when printing on a freely selected paper, which dispersion has excellent water resistance and light resistance, and is suitable for a water-based ink for writing, a water-based printing ink, an ink for information recording, or the like. Further, in accordance with the present invention, there is provided an ink for ink-jet recording and an ink-jet recording method which are suitable for thermal, piezoelectric, electric field and acoustic ink-jet systems, in which, when printing or the like is carried out by using nozzles or the like, there is little clogging of the nozzle tips, in which there is little dependency on paper, and excellent color formation and color tone are obtained when printing on a freely selected paper, and in which water resistance and light resistance are excellent.

What is claimed is:

1. A method for producing an ink jet ink, the ink jet ink comprising a colored particulate dispersion formed by dispersing, in a water based medium, colored particulates comprising an oil soluble dye and a block copolymer formed from a hydrophobic segment and a hydrophilic segment;

wherein the oil soluble dye is a compound represented by general formula (I):

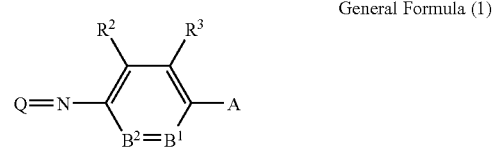

General Formula (1)

wherein Q represents an atomic group which is needed for the compound expressed by general formula (I) to have absorption in a visible range or in a near infrared range; A represents —NR$^4$R$^5$ or a hydroxy group, and R$^4$ and R$^5$ each independently represents a hydrogen atom, an alkyl group, an aryl group, or a heterocyclic group; B$^1$ represents =C(R$^6$)— or =N—; B$^2$ represents —C(R$^7$)= or —N=; R$^2$, R$^3$, R$^6$ and R$^7$ each independently represents a hydrogen atom or a substituent; and $R^2$ and $R^3$, $R^3$ and $R^4$, $R^4$ and $R^5$, $R^5$ and $R^6$, and $R^6$ and $R^7$ may bind together to form rings;

wherein a monomer forming the hydrophobic segment is ester acrylate, ester methacrylate, N-mono-substituted acrylamide, N-di-substituted acrylamide, N-mono-substituted methacrylamide, N-di-substituted methacrylamide, olefin, or vinyl ether;

wherein the block copolymer has an ionic group selected from a carboxyl group, a sulfo group, a sulfino group, or a phosphino group, and the ionic group is present in an amount from 0.2 mmol/g or more to 5.0 mmol/g or less; and wherein an average particle diameter of the colored particulates is in a range of 1 to 500 nm;

the method comprising forming the colored particulate dispersion by emulsifying and making into particulates an organic solvent phase, which comprises the block copolymer and the oil-soluble dye, by either adding water to the organic solvent phase or adding the organic solvent phase into water.

2. The method for producing an ink jet ink according to claim 1, wherein, in general formula (I), Q is a group represented by any of following (Cp-1) through (Cp-28):

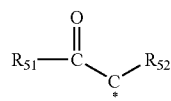
(Cp-1)

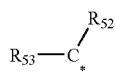
(Cp-2)

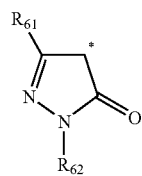
(Cp-3)

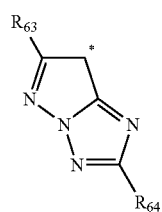
(Cp-4)

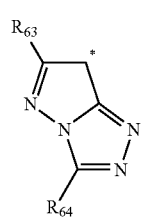
(Cp-5)

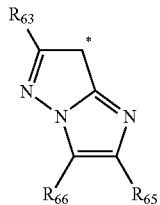
(Cp-6)

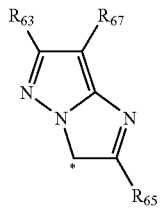
(Cp-7)

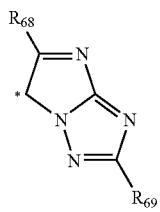
(Cp-8)

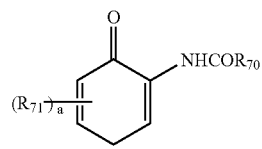
(Cp-9)

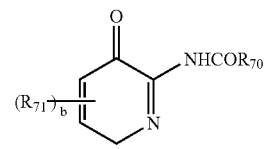
(Cp-10)

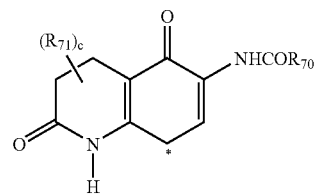
(Cp-11)

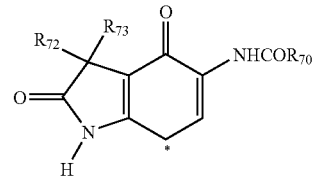
(Cp-12)

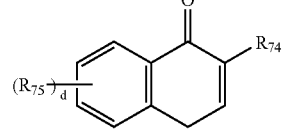
(Cp-13)

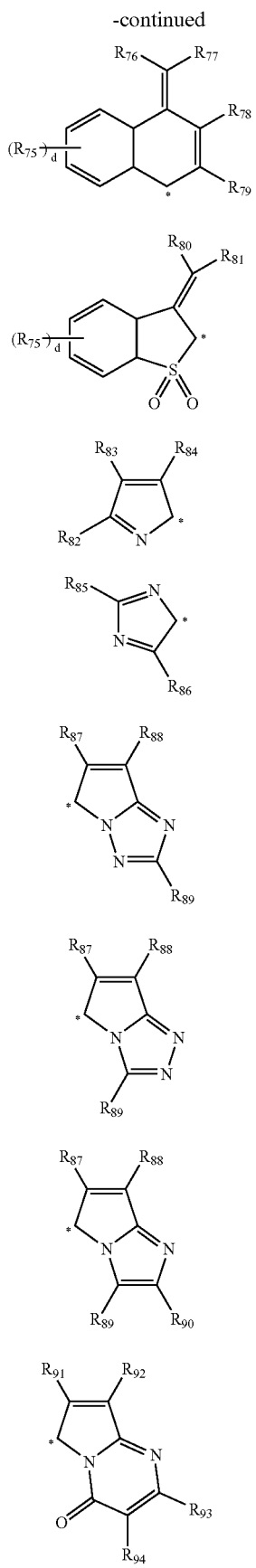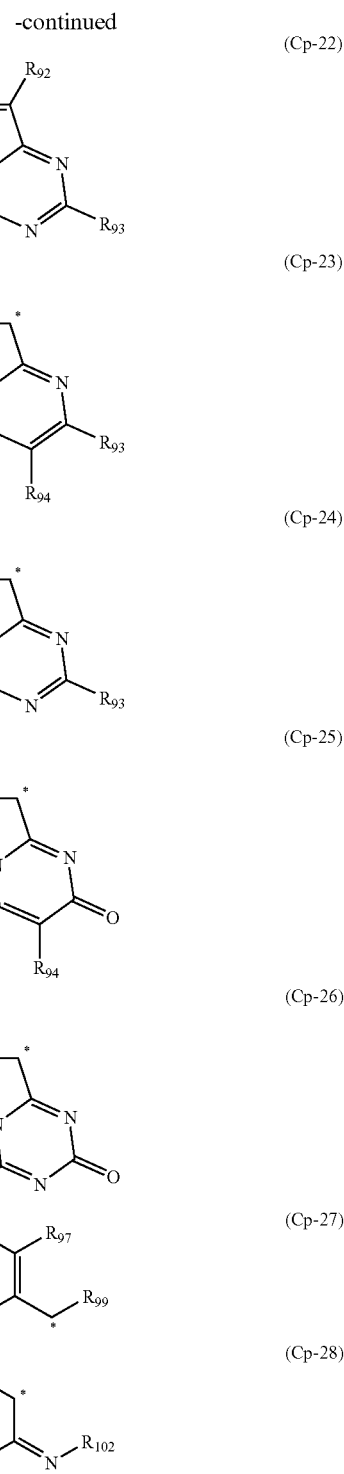

wherein, in formula (Cp-1), $R_{51}$ represents an alkyl group, an aryl group, a heterocyclic group, or an alkoxy group; and $R_{52}$ represents a carbamoyl group or a cyano group;

in formula (Cp-2), $R_{53}$ represents an aryl group or a heterocyclic group; and $R_{52}$ represents a carbamoyl group or a cyano group;

in formula (Cp-3), $R_{61}$ represents an alkyl group, an aryl group, a heterocyclic group, an acylamino group, an amino group, an alkoxy group, an aryloxy group, an alkylthio group, an arylthio group, an aminocarbonylamino group, or an alkoxycarbonylamino group; and $R_{62}$ represents an alkyl group, an aryl group, or a heterocyclic group;

in formulas (Cp-4) and (Cp-5), $R_{63}$ and $R_{64}$ each represents a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, or an alkoxycarbonylamino group;

in formulas (Cp-6) and (Cp-7), $R_{63}$ represents a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, or an alkoxycarbonylamino group; and $R_{65}$, $R_{66}$, and $R_{67}$ each represents a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group;

in formula (Cp-8), $R_{68}$ and $R_{69}$ each represents a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group or a carbamoyl group;

in formulas (Cp-9), (Cp-10), (Cp-11) and (Cp-12), $R_{70}$ represents an alkyl group, an aryl group or a heterocyclic group; $R_{71}$ represents a halogen atom, an alkyl group, an aryl group, a heterocyclic group, a silyl group, an acylamino group, an alkyl or aryl sulfonylamino group, an amino group, an aminocarbonylamino group, an alkylthio group, an arylthio group, an alkoxy group, or an alkoxycarbonylamino group; $R_{72}$ and $R_{73}$ each represents a hydrogen atom or an alkyl group; a represents an integer from 0 to 3; b represents an integer from 0 to 2; c represents an integer from 0 to 4; and when a, b or c is plural, the plural $R_{71}$ may be the same or different;

in formula (Cp-13), $R_{74}$ represents a carbamoyl group, an alkoxycarbonyl group, a cyano group, a sulfamoyl group, an acylamino group, an aminocarbonylamino group, an alkoxycarbonylamino group, or an alkyl or arylsulfonylamino group; $R_{75}$ represents a halogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, or an alkoxycarbonylamino group; d represents an integer from 0 to 4; and when d is plural, the plural $R_{75}$ may be the same or different;

in formula (Cp-14), $R_{75}$, $R_{78}$ and $R_{79}$ each represents a halogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, or an alkoxycarbonylamino group; d represents an integer from 0 to 4; and $R_{76}$ and $R_{77}$ represent a cyano group, a sulfamoyl group, an alkyl or arylsulfonyl group, an acyl group, an alkoxycarbonyl group, or a carbamoyl group;

in formula (Cp-15), $R_{75}$ represents a halogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, or an alkoxycarbonylamino group; d represents an integer from 0 to 4; and $R_{80}$ and $R_{81}$ each represent a cyano group, a sulfamoyl group, an alkyl or arylsulfonyl group, an acyl group, an alkoxycarbonyl group, or a carbamoyl group;

in formula (Cp-16), $R_{82}$, $R_{83}$, and $R_{84}$ each represents a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group or a carbamoyl group;

in formula (Cp-17), $R_{85}$ and $R_{86}$ each represents a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group or a carbamoyl group;

in formulas (Cp-18) through (Cp-20), $R_{87}$ and $R_{88}$ each represents a carbamoyl group, an alkoxycarbonyl group, an aryloxycarbonyl group, a cyano group, a sulfamoyl group, an alkanesulfonyl group, an arenesulfonyl group, or a nitro group; and $R_{89}$ and $R_{90}$ each represents a hydrogen atom, an alkyl group, an aryl group, or a heterocyclic group;

in formulas (Cp-21) through (Cp-26), $R_{91}$ and $R_{92}$ each represents an alkyl group, an aryl group, a heterocyclic group, a carbamoyl group, an alkoxycarbonyl group, an aryloxycarbonyl group, a cyano group, a sulfamoyl group, an alkanesulfonyl group, an arenesulfonyl group, or a nitro group; and $R_{93}$, $R_{94}$ and $R_{95}$ each represents a hydrogen atom, an alkyl group, an aryl group, a heterocyclic group, an acylamino group, an aminocarbonylamino group, an alkoxycarbonylamino group, an alkyl or arylsulfonylamino group, a halogen group, an amino group, an alkylthio group, an arylthio group, an alkoxy group, or an aryloxy group;

in formula (Cp-27), $R_{97}$, $R_{98}$ and $R_{99}$ each represents a hydrogen atom, a cyano group, a sulfamoyl group, an alkyl or arylsulfonyl group, an acyl group, an alkoxycarbonyl group or a carbamoyl group; and $R_{96}$ represents an amino group, an alkylthio group, an arylthio group, an alkoxy group, or an aryloxy group; and in formula (Cp-28), $R_{100}$ and $R_{101}$ each represents a hydrogen atom, a perfluoroalkyl group, a cyano group, a nitro group, a sulfamoyl group, an alkyl or arylsulfonyl group, an acyl group, an alkoxycarbonyl group, a carbamoyl group, an alkylthio group or an arylthio group; and $R_{102}$ represents an alkyl group, an aryl group, a heterocyclic group, a sulfamoyl group, an alkyl or arylsulfonyl group, an acyl group, an alkoxycarbonyl group, or a carbamoyl group.

3. The method for producing an ink jet ink according to claim 2, wherein, in general formula (I), Q is a group represented by any of (Cp-1), (Cp-2), (Cp-4), (Cp-5), (Cp-11), (Cp-12), (Cp-18), (Cp-21), or (Cp-22).

4. The method for producing an ink jet ink according to claim 1, wherein the water based medium is one of water, a water soluble organic solvent, or a mixture of a water miscible liquid and water.

5. The method for producing an ink jet ink according to claim 1, wherein the block copolymer is AB type, $B^1AB^2$ type, or $A^1BA^2$ type, where $A^1$ and A2 may be the same or different, $B^1$ and $B^2$ may be the same or different and wherein A is the hydrophobic segment and B is the hydrophilic segment.

6. The method for producing an ink jet ink according to claim 5, wherein the block copolymer is a vinyl polymer.

7. The method for producing an ink jet ink according to claim 6, wherein a vinyl monomer B forming the hydrophilic segment B is acrylic acid, methacrylic acid, ester acrylate having a hydrophilic substituent at the ester moiety, ester methacrylate, acrylamide, or methacrylamide.

8. The method for producing an ink jet ink according to claim 7, wherein a mole ratio of the vinyl monomer B contained in the hydrophilic segment B to a vinyl monomer A is 100:0 to 60:40.

9. The method for producing an ink jet ink according to claim 5, wherein a mole ratio of a vinyl monomer A contained in the hydrophobic segment A to a vinyl monomer B is 100:0 to 60:40.

10. The method for producing an ink jet ink according to claim 1, wherein a molecular weight (Mn) of the block copolymer is from 1000 to 100,000.

11. The method for producing an ink jet ink according to claim 1, wherein the colored particulates contain a hydrophobic high boiling point organic solvent having a boiling point of 150° C. or more.

12. The method for producing an ink jet ink according to claim 1, wherein, in the colored particulate dispersion, an amount of the block copolymer which is used is 10 to 1000 parts by mass with respect to 100 parts by mass of the oil soluble dye.

13. The method for producing an ink jet ink according to claim 1, wherein an amount of the colored particulates contained in the colored particulate dispersion is 1 to 45% by mass.

* * * * *